US010587766B2

(12) United States Patent
Utoh

(10) Patent No.: US 10,587,766 B2
(45) Date of Patent: Mar. 10, 2020

(54) ELECTRONIC DEVICE, SCREEN DISPLAY METHOD, AND COMPUTER PROGRAM PRODUCT FOR CHANGING A DISPLAY APPEARANCE OF A SCREEN BASED ON A PARAMETER RECEIVED FROM AN APPLICATION

(71) Applicant: Yohsuke Utoh, Kanagawa (JP)

(72) Inventor: Yohsuke Utoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/290,991

(22) Filed: Mar. 4, 2019

(65) Prior Publication Data
US 2019/0289148 A1  Sep. 19, 2019

(30) Foreign Application Priority Data

Mar. 16, 2018  (JP) ................................. 2018-050213
Mar. 16, 2018  (JP) ................................. 2018-050225
Nov. 16, 2018  (JP) ................................. 2018-215496

(51) Int. Cl.
| | |
|---|---|
| H04N 1/00 | (2006.01) |
| G06F 3/0482 | (2013.01) |
| G06F 9/451 | (2018.01) |
| G06F 3/0481 | (2013.01) |

(52) U.S. Cl.
CPC ....... *H04N 1/00482* (2013.01); *G06F 3/0481* (2013.01); *G06F 3/0482* (2013.01); *G06F 9/451* (2018.02); *H04N 1/00408* (2013.01); *H04N 1/00474* (2013.01); *H04N 1/00477* (2013.01)

(58) Field of Classification Search
None
See application file for complete search history.

(56) References Cited

U.S. PATENT DOCUMENTS

| | | |
|---|---|---|
| 9,584,687 B2 | 2/2017 | Watanabe et al. |
| 9,817,463 B2 | 11/2017 | Yoshida et al. |
| 2011/0145843 A1 | 6/2011 | Ohhashi et al. |
| 2011/0292428 A1 | 12/2011 | Ishii |
| 2011/0317189 A1 | 12/2011 | Utoh |

(Continued)

FOREIGN PATENT DOCUMENTS

| | | |
|---|---|---|
| JP | 2011-123842 | 6/2011 |
| JP | 2014-150320 | 8/2014 |
| JP | 2018-046551 | 3/2018 |

OTHER PUBLICATIONS

Extended European Search Report dated Jul. 18, 2019 in corresponding European Patent Application No. 19158526.4, 7 pages.

*Primary Examiner* — Andrew H Lam
(74) *Attorney, Agent, or Firm* — Oblon, McClelland, Maier & Neustadt, L.L.P.

(57) ABSTRACT

An electronic device includes at least one application and a function providing application. The function providing application includes a first accepting unit and a first displaying unit. The first accepting unit is configured to accept a display request of a screen from the at least one application. The display request includes a parameter relating to a display appearance of the screen. The first displaying unit is configured to display the screen, a display appearance of which is changed based on the parameter in accordance with the display request accepted by the first accepting unit.

11 Claims, 22 Drawing Sheets

(56) References Cited

U.S. PATENT DOCUMENTS

| | | |
|---|---|---|
| 2012/0151230 A1 | 6/2012 | Utoh |
| 2013/0128299 A1 | 5/2013 | Utoh et al. |
| 2013/0128313 A1 | 5/2013 | Hirokawa et al. |
| 2013/0156457 A1 | 6/2013 | Tsukahara et al. |
| 2014/0215499 A1 | 7/2014 | Kawai |
| 2017/0078498 A1 | 3/2017 | Hirokawa |
| 2018/0068345 A1* | 3/2018 | Hirokawa .......... G06Q 30/0251 |
| 2018/0267753 A1 | 9/2018 | Asakimori et al. |

* cited by examiner

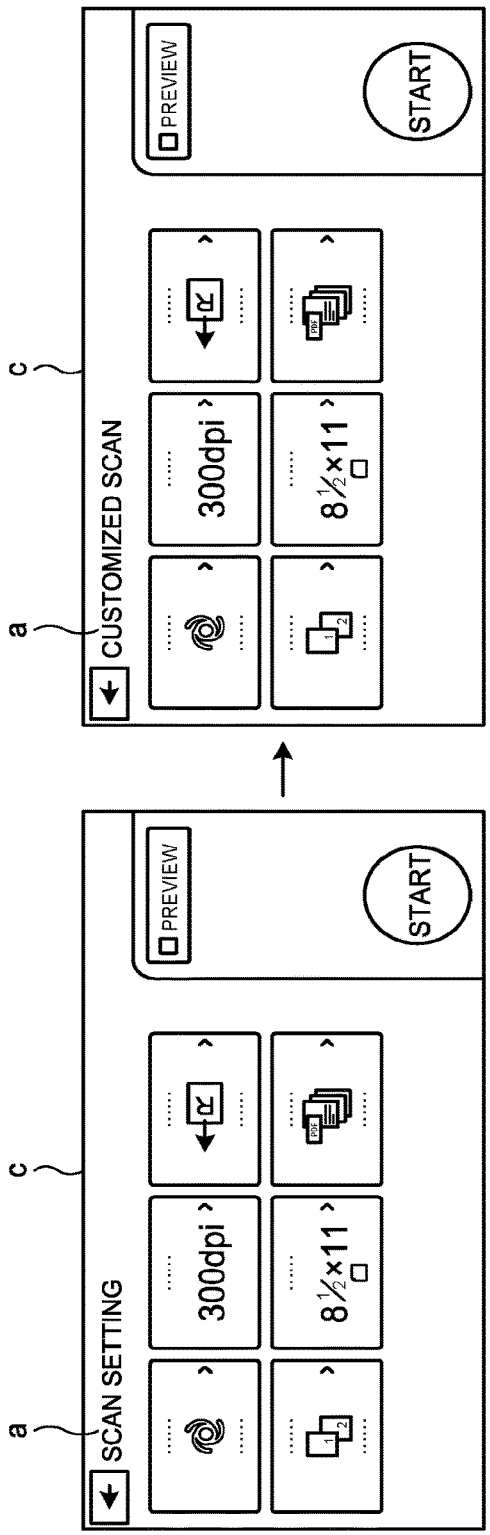
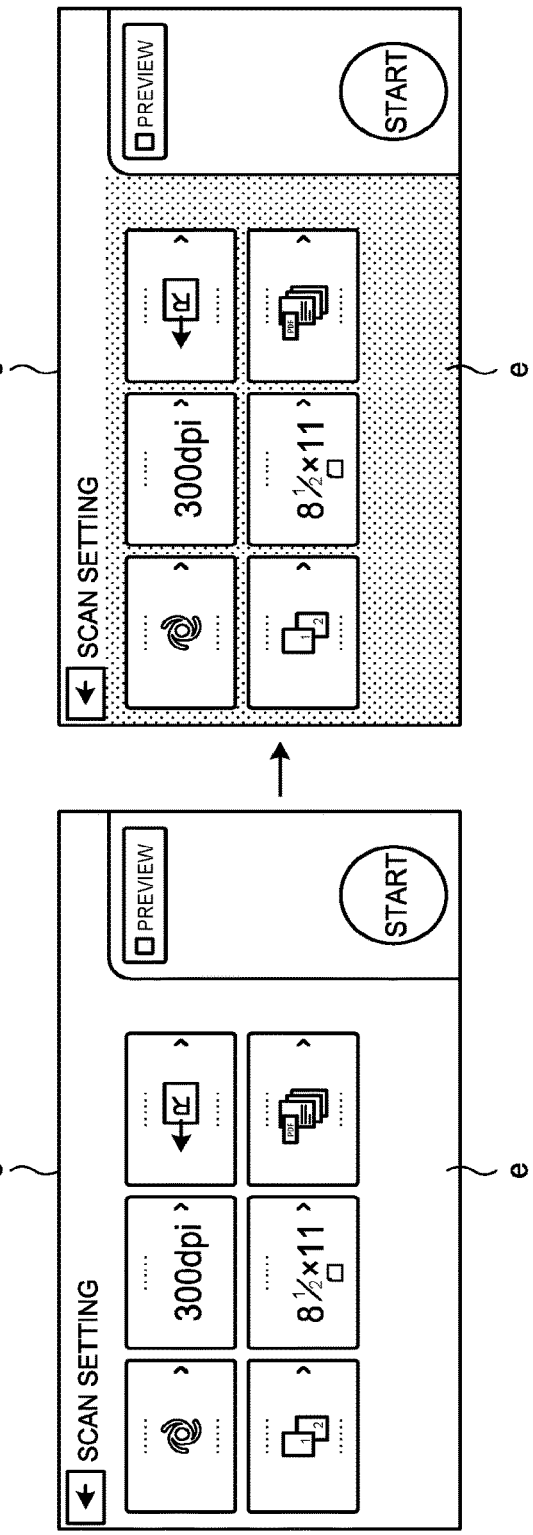
FIG.9A
FIG.9B

FIG.12

| NUMBER | USER NAME | UI PARAMETER |
|---|---|---|
| 1 | user A | Title=sample application<br>Title font=red<br>header image=xxx.jpg |
| 2 | user B | Title=test application<br>Title font=blue |
| 3 | user C | Title=test application<br>Title font=blue<br>Key name=Scan |

FIG.17

| IDENTIFIER OF VENDOR APP |
|---|
| jp.co.advop.xxxx |

FIG.18

| IDENTIFIER OF VENDOR APP | SETTING ITEM |
|---|---|
| jp.co.advop.xxxx | CORY NUMBER SETTING: 10<br>COLOR SETTING: MONOCHROME |

ELECTRONIC DEVICE, SCREEN DISPLAY METHOD, AND COMPUTER PROGRAM PRODUCT FOR CHANGING A DISPLAY APPEARANCE OF A SCREEN BASED ON A PARAMETER RECEIVED FROM AN APPLICATION

CROSS-REFERENCE TO RELATED APPLICATIONS

The present application claims priority under 35 U.S.C. § 119 to Japanese Patent Application No. 2018-50213, filed on Mar. 16, 2018, Japanese Patent Application No. 2018-50225, filed on Mar. 16, 2018 and Japanese Patent Application No. 2018-215496, filed on Nov. 16, 2018. The contents of which are incorporated herein by reference in their entirety.

BACKGROUND OF THE INVENTION

1. Field of the Invention

The present invention relates to an electronic device, a screen display method, and a computer program product.

2. Description of the Related Art

Conventionally, when control applications that control functions of electronic devices, such as a control application to perform scanning, printing, and the like in an image forming apparatus including a multifunction peripheral (MFP), is created, development of application adapting to complicated functions of electronic devices is necessary, and multiple development processes are required.

To tackle this problem, a technique of using application software that provides a screen or a function of a control application of an electronic device (hereinafter, referred to as function providing app) to enable development of a control application easily has been disclosed.

Particularly, when a development vendor develops a control application of an electronic device, it is desired that the development be possible without increasing development processes, such as understanding precise specifications of the electronic device.

As described, the technique in which a function providing app performs intricate processing to control functions of an electronic device as an intermediary to develop a control application with the fewer number of processes has already been known (for example, Japanese Unexamined Patent Application Publication No. 2014-150320).

However, in the conventional function providing app, a user interface (UI) of an app to call functions provided by the function providing app and a UI of the function providing app differ from each other in display appearance, and there has been a problem of appearing unnatural to users.

SUMMARY OF THE INVENTION

According to one aspect of the present invention, an electronic device includes at least one application and a function providing application. The function providing application includes a first accepting unit and a first displaying unit. The first accepting unit is configured to accept a display request of a screen from the at least one application. The display request includes a parameter relating to a display appearance of the screen. The first displaying unit is configured to display the screen, a display appearance of which is changed based on the parameter in accordance with the display request accepted by the first accepting unit.

BRIEF DESCRIPTION OF THE DRAWINGS

FIGS. 9A and 9B are diagrams showing changing examples according to UI parameters;

FIG. 12 is a diagram showing an example of association information of user information and UI parameters;

FIG. 17 is a diagram showing an example of an identifier of the vendor app;

FIG. 18 is a diagram showing an example of a vendor identifier and setting items;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
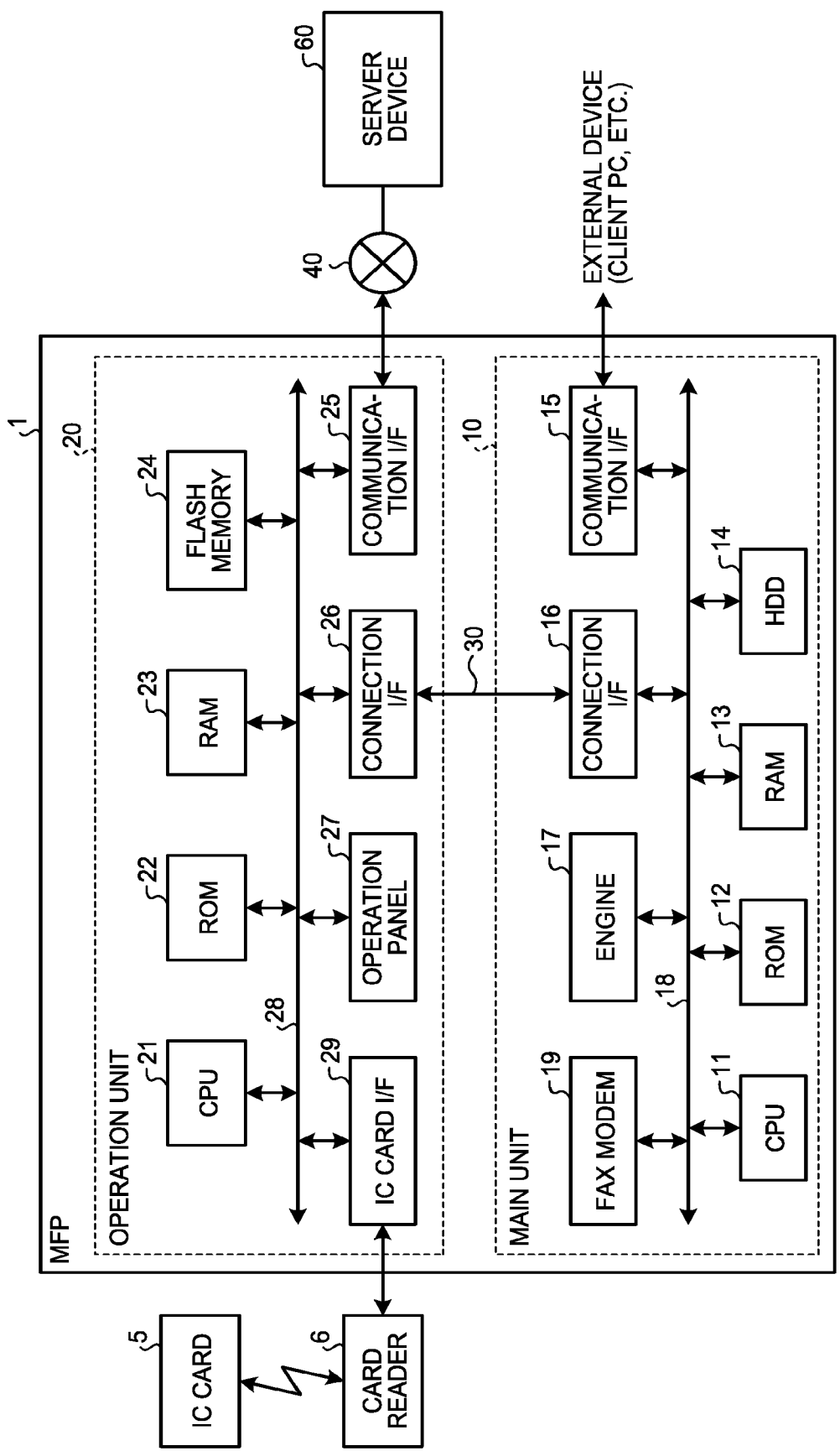
FIG. 1 is a hardware configuration diagram of an MFP according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to unify display appearances among apps, such as a UI of a function providing app and a UI of a call source app that calls functions to be provided by the function providing app, such that users do not have a sense of incongruity.

Embodiments of an electronic device, a screen display method, and a program are described in detail below with reference to the accompanying drawings.

First Embodiment

FIG. 1 is a hardware configuration diagram of an MFP 1 according to a first embodiment. The MFP 1 is an example of an image processing apparatus (electronic device). The MFP 1 includes, as shown in FIG. 1, a main unit 10 that is a main part performing various kinds of image processing, such as a copier function, a scanner function, a facsimile function, and a printer function, and an operation unit 20 that accepts an operation of an instruction to perform image processing, for example, from a user.

The main unit 10 and the operation unit 20 are connected to be able to communicate with each other through a dedicated communication path 30. For the communication path 30, for example, one of a universal serial bus (USB) standard can be used. Moreover, the communication path 30 can be of any standard irrespective of wired or wireless communication. Furthermore, the main unit 10 may have one function or more than one function out of the image processing functions, such as the copier function, the scanner function, the facsimile function, and the printer function.

As the operation unit 20, an electronic device that is capable of performing information processing to be completed alone. As an example, as the operation unit 20, an information processing terminal, such as a smartphone and a tablet terminal, can be used. In this case, the information processing terminal used as the operation unit 20 functions as an operation unit of the MFP 1.

More specifically, The MFP 1 has conventionally been equipped with a dedicated operation panel fixed there to as the operation unit. On the other hand, the information processing terminal used as the operation unit 20 of the MFP 1 of the first embodiment is attachable and detachable to the main unit 10 of the MFP 1. That is, the information processing terminal used as the operation unit 20 is removable (separable) from a predetermined position, for example, a position at which the operation panel of the MFP 1 is placed, and can be mounted on the MFP 1 in an integrated manner also. Therefore, the information processing terminal used as the operation unit 20 and the MFP 1 are regarded as a single apparatus.

Detached from the MFP 1, the information processing terminal used as the operation unit 20 performs wireless communication by, for example, Bluetooth (registered trademark), or infrared communication with the MFP 1, and functions as the operation unit of the MFP 1.

The main unit 10 operates according to an input accepted by the operation unit 20. Moreover, the main unit 10 can communicate also with an external device, such as a client personal computer (PC), and also operates according to an instruction received from the external device.

Hardware Configuration of Main Unit

Next, a hardware configuration of the main unit 10 is described. As shown in FIG. 1, the main unit 10 includes a central processing unit (CPU) 11, a read-only memory (ROM) 12, a random access memory (RAM) 13, and a hard disk drive (HDD) 14. Furthermore, the main unit 10 includes a communication interface (I/F) 15, a connection I/F 16, an engine 17, and a facsimile modem (FAX modem) 19. The respective components 11 to 17 and the FAX modem 19 are connected one another through a system bus 18.

The CPU 11 functions as a first CPU that executes a control application described later, and overall controls operations of the main unit 10. The CPU 11 executes a program stored in the ROM 12, the HDD 14, or the like using the RAM 13 as a work area, and thereby controls overall operations of the main unit 10 and implements the various kinds of image forming functions, such as the copier function, the scanner function, the facsimile function, and the printer function, described above. Note that the HDD 14 of the main unit 10 can be implemented similarly by using a flash memory also.

The communication I/F 15 is an interface to communicate with an external device, such as a client PC, a web server device, and an authentication server, on a network 40. The connection I/F 16 is an interface to communicate with the operation unit 20 through the communication path 30. Note that even though the communication path 30 is illustrated as wired connection in FIG. 1 and FIG. 2 described in the following, the operation unit 20 is arranged to be attachable and detachable with respect to the main unit 10 of the MFP 1 as described above. Therefore, it is preferable to be understood that the communication path 30 functions as a wired communication path when the operation unit 20 is attached to the MFP 1, and the communication path 30 functions as a wireless communication path when the operation unit 20 is detached from the MFP 1.

The engine 17 is general-purpose hardware that performs processing other than information processing and communication, to implement the copier function, the scanner function, the facsimile function, the printer function, and the like. The engine 17 includes, for example, a scanner that scans and reads an image of an original, and a plotter that performs printing onto a sheet material, such as a paper sheet, and a facsimile communication unit that performs facsimile communication. Specific options, such as a finisher to sort printed sheet materials and an automatic document feeder (ADF) that automatically feeds originals, may further be provided.

Hardware Configuration of Operation Unit

Next, a hardware configuration of the operation unit 20 is described. As shown in FIG. 1, the operation unit 20 includes a CPU 21, a ROM 22, a RAM 23, a flash memory 24, a communication I/F 25, a connection I/F 26, an operation panel 27, and an IC card I/F 29, and these are connected one another through a system bus 28. Note that by using an HDD in place of the flash memory 24, the operation unit 20 can be implemented similarly.

The CPU 21 functions as a second CPU that executes various kinds of applications and a function providing application described later, and overall controls operations of the operation unit 20. The CPU 21 executes a program stored in the ROM 22 or the like using the RAM 23 as a work area, and thereby control overall operations of the operation unit 20. Furthermore, the CPU 21 executes a user authentication program stored in the ROM 22 or the like, and thereby performs user authentication processing. The communication I/F 25 is an interface to communicate with, for example, a server device 60 on the network 40. The connection I/F 26 is an interface to communicate with the main unit 10 through the communication path 30.

The IC card I/F 29 is connected to a card reader 6, for example, through a USB cable. The card reader 6 performs non-contact wireless communication with an integrated circuit (IC) card 5 subjected to a proximity operation (non-contact operation) by a user, and reads authentication information, such as a card identification (ID) and user information, stored in the IC card 5. Note that the authentication information may be read from the IC card 5 by a contact operation other than the non-contact operation.

Moreover, it has been described that the card reader 6 and the operation unit 20 are arranged such that physically separate devices are connected through the USB cable or the like as an example, but the card reader 6 may be integrated with the operation unit. That is, the operation unit 20 and the card reader 6 may be formed in one piece (formed as a single device).

Furthermore, even if the designations differ, such as IC card and ID card, the present invention is applicable to any storage medium as long as it is a storage medium, and an application range of the present invention is not to be limited to the IC card, the ID card, and the like only. Moreover, the same applies to the card reader device, and any device can be used as long as the device can read user information from such a storage medium.

The operation panel 27 is constituted of a liquid crystal display (LCD) equipped with a touch sensor. The operation panel 27 accepts various kinds of inputs according to operations of a user, and displays various kinds of information, such as information according to an accepted input, information indicating an operating status of the MFP 1, and information indicating a setting status. The operation panel 27 may be constituted of an organic light emitting diode (OLED) display equipped with a touch panel. Furthermore, in addition thereto or in place thereof, an operation unit of a hardware key or the like, or a display unit of a light emitting unit or the like may be provided.

Software Configuration of MFP

Figure 2:
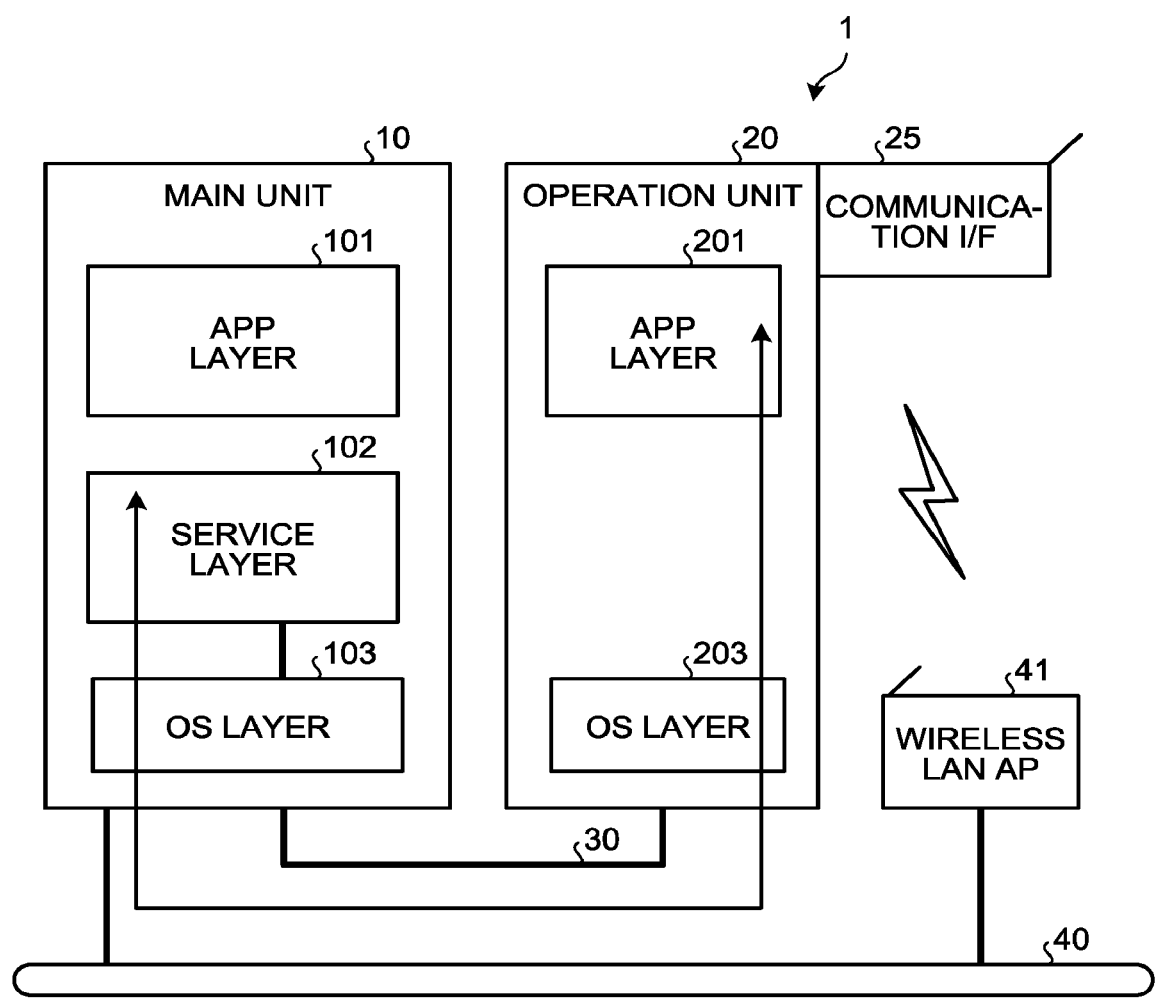
FIG. 2 is a diagram showing an example of a software configuration of the MFP.

FIG. 2 is a diagram showing an example of a software configuration of the MFP 1. As shown in FIG. 2, the main unit 10 includes an app layer 101, a service layer 102, and an operating system (OS) layer 103. Substances of the app layer 101, the service layer 102, and the OS layer 103 are various kinds of software stored in the ROM 12, the HDD 14, or the like. The respective functions are provided by executing the software by the CPU 11.

The software of the app layer 101 is a control application (also referred to as simply "app" in the following description) to operate hardware resources to provide predetermined functions, that is, to control to perform the functions of the MFP 1. For example, the app includes a copier app to provide the copier function, a scanner app to provide the scanner function, a FAX app to provide the facsimile function, and a printer app to provide the printer app.

The software of the service layer 102 is software that mediates between the app layer 101 and the OS layer 103 to provide to the app an interface to use the hardware resources included in the main unit 10. Specifically, it is software to provide a function of accepting action requests to the hardware resources and of performing arbitration of the action requests. The action requests accepted by the service layer 102 include, for example, a read request by a scanner or a print request by a plotter.

The interface function of the service layer 102 is also provided not only to the app layer 101 of the main unit 10, but also provided to an app layer 201 of the operation unit 20. That is, the app layer 201 (app) of the operation unit 20 can also implement functions using the hardware resources (for example, the engine 17) of the main unit 10 through the interface function of the service layer 102.

Software of the OS layer 103 is basic software (operating system) to provide basic functions to control the hardware in the main unit 10. The software of the service layer 102 converts a request to use a hardware resource from each app into a command that can be interpreted by the OS layer 103 to transfer to the OS layer 103. Thus, the command is executed by the software of the OS layer 103, and the hardware resource thereby performs an operation according to the request of the app.

Similarly, the operation unit 20 has the app layer 201 and an OS layer 203. The app layer 201 and the OS layer 203 of the operation unit 20 also have a hierarchical structure similar to that of the main unit 10. However, types of action requests acceptable by the functions provided by the app of the app layer 201 differ from those of the main unit 10. The app of the app layer 201 is software to provide predetermined functions by operating the hardware resources in the operation unit 20. For example, it is software to provide a function of UI to perform operations and display relating to the functions (the copier function, the scanner function, the facsimile function, the printer function) of the main unit 10.

Furthermore, in the case of the MFP 1 of the first embodiment, to maintain the independency of function, the software of the OS layer 103 of the main unit 10 and the software of the OS layer 203 of the operation unit 20 differ from each other. As an example, Linux (registered trademark) is installed as the software of the OS layer 103 of the main unit 10, and Android (registered trademark) is installed as the software of the OS layer 203 of the operation unit 20. Thus, the main unit 10 and the operation unit 20 operate independently of each other by different operating systems.

By operating the main unit 10 and the operation unit 20 with different operating systems, communication between the main unit 10 and the operation unit 20 is performed not as interprocess communication within a common device, but as communication between different devices. An operation of transmitting an input (instruction from a user) accepted by the operation unit 20 to the main unit 10, an operation of notifying the operation unit 20a of an event by the main unit 10, and the like correspond thereto. In this example, a function of the main unit 10 can be used by performing command communication to the main unit 10 by the operation unit 20. Moreover, events of which the main unit 10 notifies the operation unit 20 include an operating status of an action by the main unit 10, settings made in the main unit 10, and the like.

Furthermore, in the example of the first embodiment, power supply to the operation unit 20 is performed through the communication path 30 from the main unit 10. Therefore, a power source control of the operation unit 20 can be performed separately (independently) from a power source control of the main unit 10.

In this example, the main unit 10 and the operation unit 20 are electrically and physically connected through the communication path 30, but the operation unit 20 can also be detached from the main unit 10 as described above. In this case, for example, a near-field wireless communication unit, such as an infrared communication unit, a radio-frequency (RF) communication unit, and a Bluetooth (registered trademark) communication unit, is provided in the main unit 10 and the operation unit 20. RF is a short form of "radio frequency". Moreover, a wireless local area network (LAN) communication function, such as Wi-Fi (registered trademark), may be provided in the main unit 10 and the operation unit 20, to enable mutual communication through a wireless LAN access point (wireless LANAP) and the network 40 as shown in FIG. 2. LAN is a short form of local area network. When the operation unit 20 is detachable from the main unit 10, the operation unit 20 accumulates power supplied from the main unit 10 through the communication path 30 in a secondary battery, and performs communication with the main unit 10, operating with power accumulated in the secondary battery when detached from the main unit 10.

Software Installed on MFP

Figure 3:
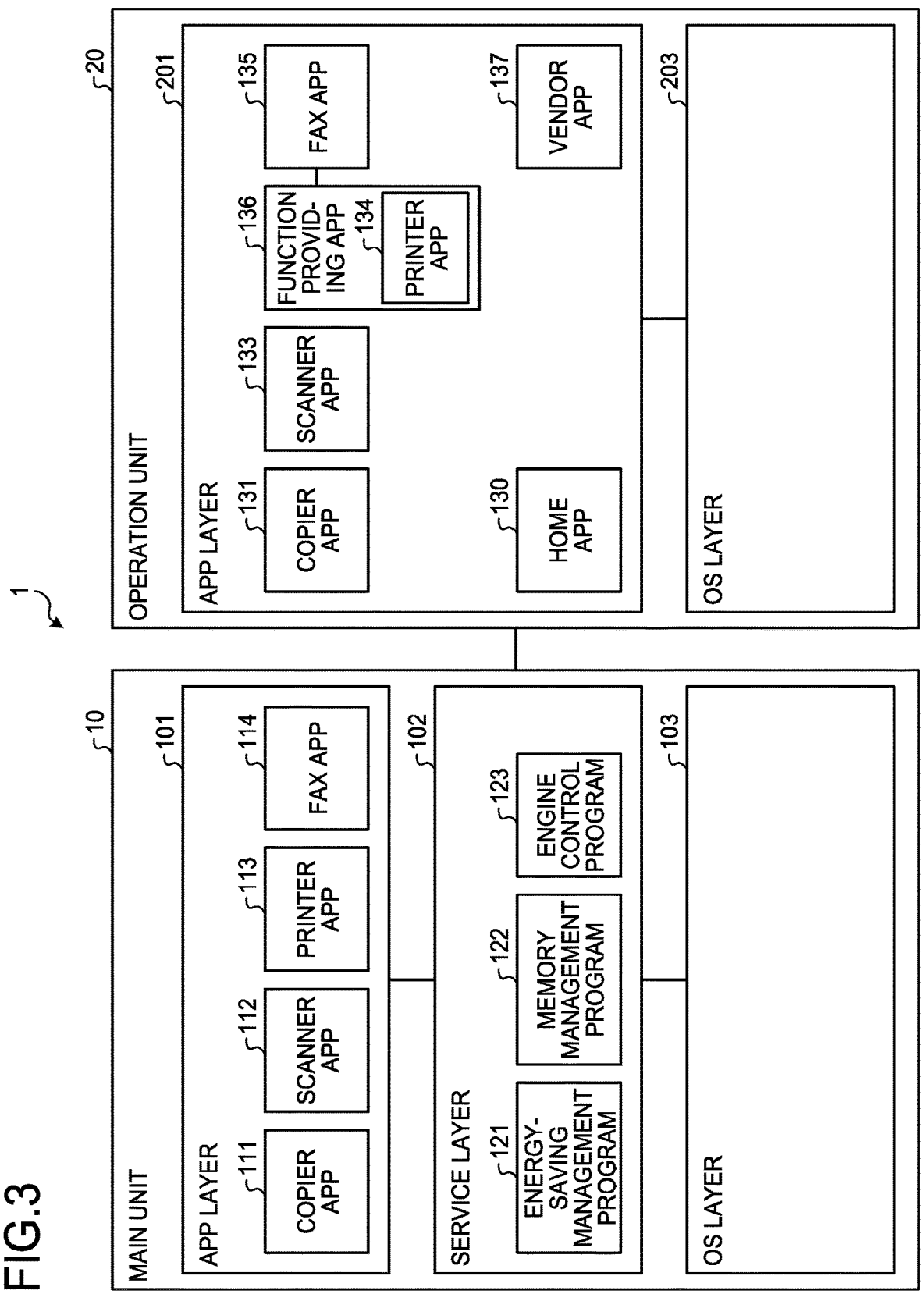
FIG. 3 is a diagram showing an example of software installed on the MFP.

FIG. 3 shows an example of software installed on the MFP 1. As described above, the main unit 10 is divided into the app layer 101, the service layer 102 and the OS layer 103. Out of these, the app layer 101 stores an app that controls the engine 17 shown in FIG. 1 to perform a control of original reading, a control of printing, and the like. Specifically, in the app layer 101, a copier app 111, a scanner app 112, a printer app 113, and a FAX app 114 are stored. The copier app 111 to the FAX app 114 are job-execution function apps of standard equipment, and examples of a control application.

Furthermore, in the service layer, various kinds of programs corresponding to processing performed in common by the respective apps, such as an energy-saving management program 121, a memory management program 122, and an engine control program 123, are stored. The service layer 102 performs common processing performed by the respective apps, such as energy-saving management and memory management.

On the other hand, the operation unit 20 is divided into the app layer 201 and the OS layer 203. The difference between the main unit app and the operation unit app is that the main unit app controls functions of an image forming apparatus, such as reading and printing, by performing an engine control and the like, while the operation unit app performs a UI control. That is, the operation unit app performs a screen display to accept a user operation, and the main unit app performs an engine control based on the user operation.

In the operation unit app, a vendor app 137 developed by a development vendor with respect to the scanner app 133 is present.

Moreover, in the operation unit app, to facilitate development of the vendor app 137, a function providing app 136 that is a function providing application to provide functions equivalent to the copier app 131 to the FAX app 135 to a vendor and the like is provided.

That is, in the app layer 201 of the operation unit 20, an app that accepts a user operation through a user interface is stored. Specifically, in the app layer 201, various kinds of applications including a home app 130, a copier app 131, a scanner app 133, a printer app 134, a FAX app 135, a function providing app 136, the vendor app 137, and the like. The printer function is described in the following as the function provided by the function providing app 136 by way of example, but it is not limited thereto. That is, the function providing app 136 can support the functions of the main unit 10 or the operation unit 20, such as the copier function, the scanner function, and the FAX function.

The home app 130 displays a main screen (initial screen) in which icons to specify a desirable operation and the like are arranged, and activates an app specified by a user through an icon operation. The copier app 131 is an app that accepts a copy operation by a user through an operation button, a setting button, and the like. The scanner app 133 is an app that accepts a scan operation by a user through an operation button, a setting button, and the like. The printer app 134 is an app that accepts a print operation by a user through an operation button, a setting button, and the like. The FAX app 135 is an app that accepts a facsimile transception operation by a user through an operation button, a setting button, and the like.

The function providing app 136 is an example of the image processing program. Moreover, the function providing app 136 is stored in a storage unit, for example, in the ROM 22, the RAM 23, or the flash memory 24 of the operation unit 20.

The function providing app 136 provides functions equivalent to the copier app 131 to the FAX app 135 of the operation unit 20 to a development vendor or the like to facilitate development of the vendor app 137 as described above.

The vendor app 137 is an example of a request application. The vendor app 137 calls the function providing app 136 relating to, for example, the printer app 134, for example, at the time of setting or executing of printing.

That is, for example, when the function providing app 136 is an app corresponding to the scanner app 133, the function providing app 136 provides a function of displaying a user interface including a regular operation menu, a setting menu, and the like to the development vendor.

As described, in the operation unit 20 of the MFP 1, the function providing app 136 to provide functions equivalent to the copier app 131 to the FAX app 135 is provided. To the development vendor of the vendor app 137, an application programmable interface (API) that implements the function of the function providing app 136 is released.

In the present embodiment, the function providing app 136 is a single application that has two roles as "printer app of standard equipment" and "app to provide a function to a vendor app".

In the present embodiment, the function providing app 136 is described as to be applied only to the printer app 134. Note that the function providing app 136 is applicable not only to the printer app 134, but also to the other apps of the copier app 131, the scanner app 133, and the like without any problem.

Figure 4:
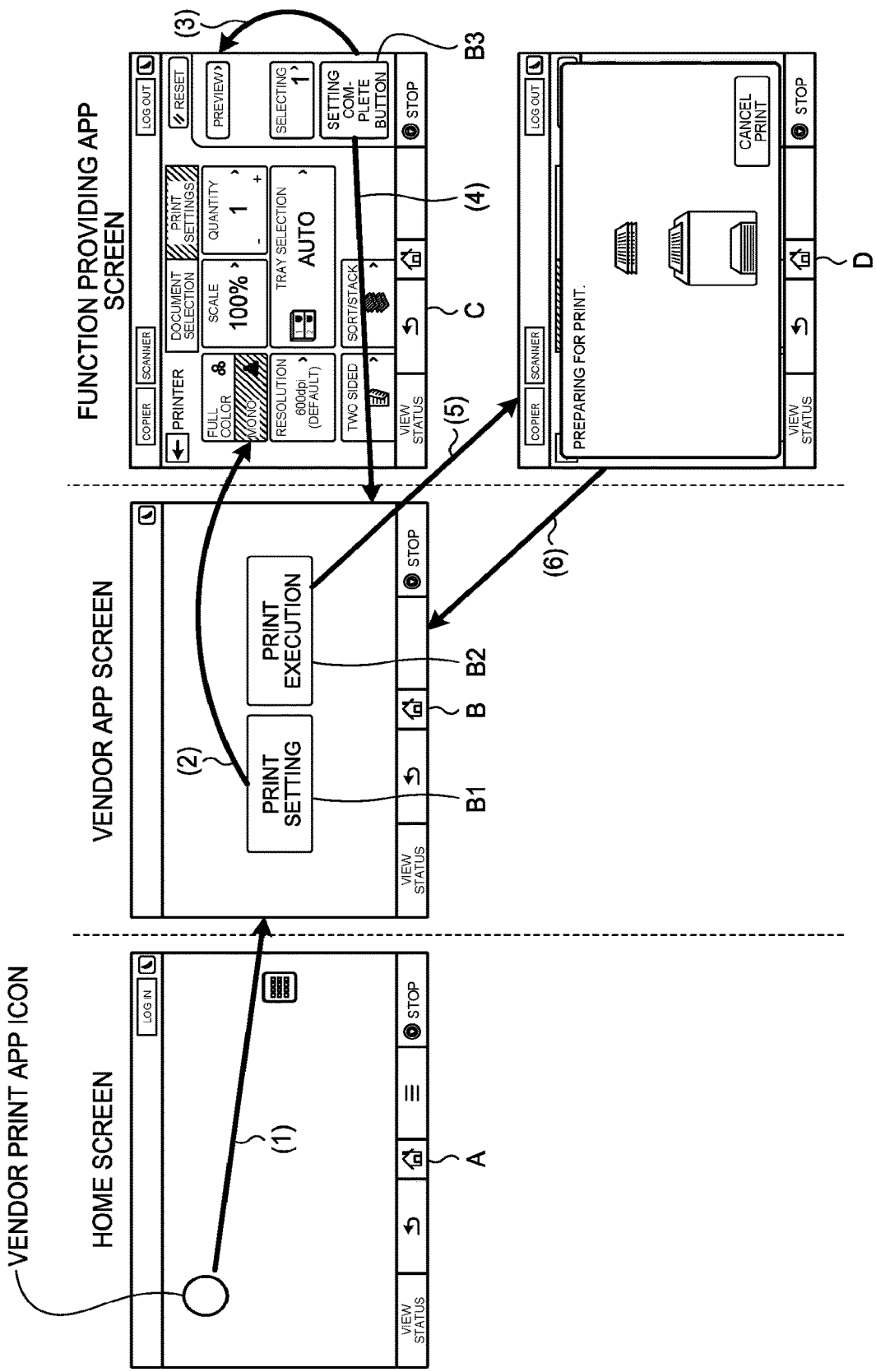
FIG. 4 is a diagram showing an example of a screen transition of an operation unit of the MFP.

FIG. 4 is a diagram showing an example of a screen transition of the operation unit 20 of the MFP 1. FIG. 4 shows a screen transition (setting, execution) when the function providing app 136 is called by the vendor app 137. In FIG. 4, a broken line signifies a boundary, and an arrow from an app to another app expresses switch of apps, and an arrow from an app to the same app signifies a screen switch within the app.

(1) First, when an icon indicating the vendor app 137 is selected on a home screen A to select an app to be used by a user (icons of various apps installed on the MFP 1 are displayed), the vendor app 137 starts. A screen B of the vendor app 137 is displayed according to a request from the vendor app 137 including parameters, and is a selecting screen to select a setting input for image processing, or an execution instruction of image processing.

(2) When a print setting button B1 on the screen B of the vendor app 137 is pressed, the function providing app 136 starts to switch apps, and a setting screen C is displayed. The setting screen C is a setting input screen for image processing displayed when the setting input is selected on the screen B of the vendor app 137. Internally, an API call from the vendor app 137 with respect to the function providing app 136 is performed to start the function providing app 136.

(3) With the function providing app 136, various print settings can be made by user operations.

(4) When a setting complete button B3 on the setting screen C of the function providing app 136 is pressed, set information in the print settings is confirmed, and apps are switched to return to the screen B of the vendor app 137. Internally, setting value information is given to the vendor app 137.

(5) When a print execution button B2 on the screen B of the vendor app 137 is pressed, the function providing app 136 starts to switch apps. The print execution screen D is displayed, and print is performed. Internally, an API call from the vendor app 137 with respect to the function providing app 136 is performed to start the function providing app 136. Moreover, at the API call, a file path of an object to be printed is transferred to the function providing app 136 as a parameter. Note that the information transferred to the function providing app 136 may include setting value information of a file of an object to be printed.

(6) When the print is completed, apps are switched to return to the screen B of the vendor app 137.

Figure 5:
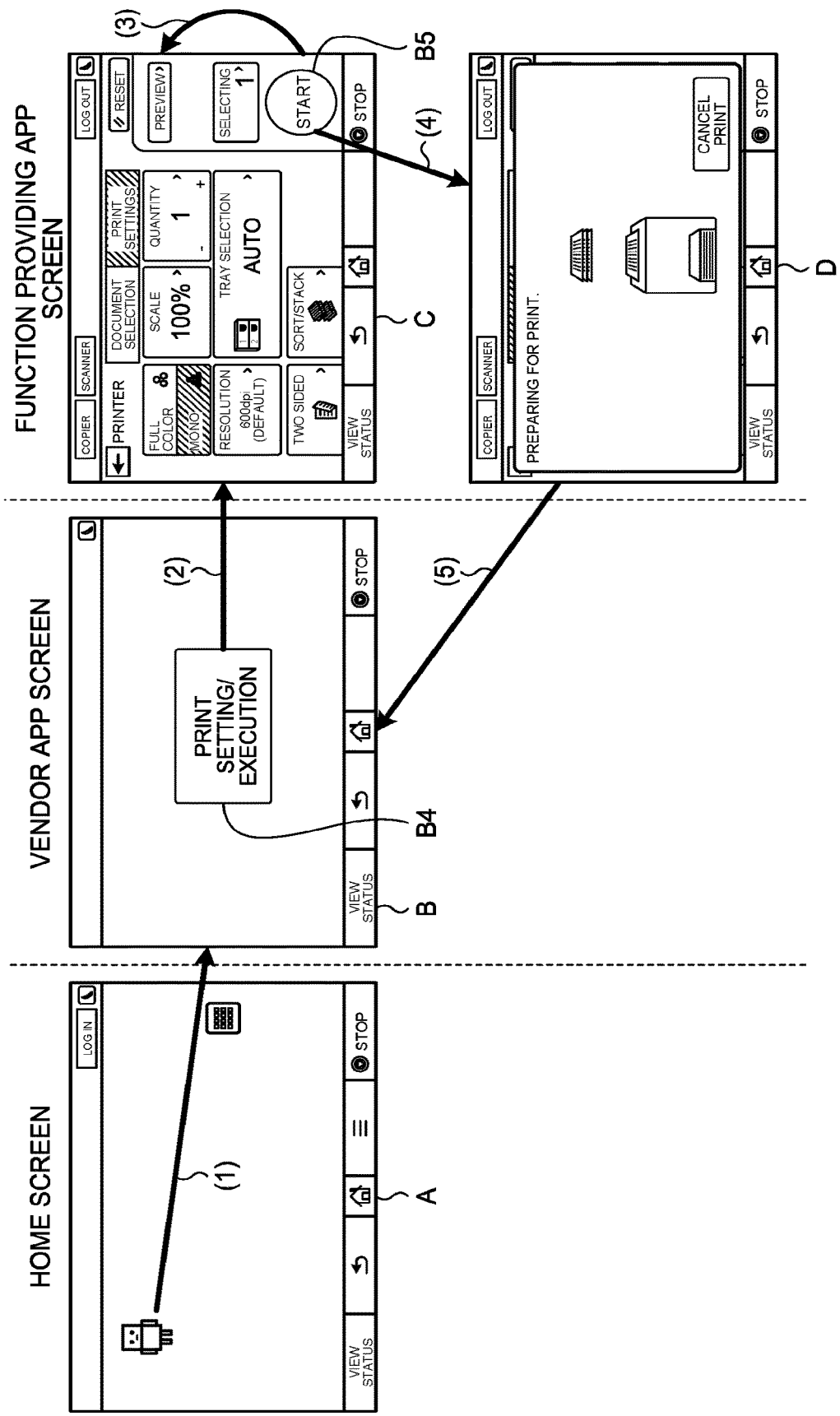
FIG. 5 is a diagram showing another example of the screen transition of the operation unit of the MFP.

Furthermore, FIG. 5 is a diagram showing another example of the screen transition of the operation unit 20 of the MFP 1. FIG. 5 shows screen transition (setting+execution) when the function providing app 136 functions as a standard equipped app. In FIG. 5, a broken line expresses a boundary between apps, an arrow from an app to another app signifies switch of apps, and an arrow from an app to the same app signifies a screen switch within the app.

(1) First, when an icon indicating the vendor app 137 is selected on the home screen A to select an app to be used by a user (icons of various apps installed on the MFP 1 are displayed), the vendor app 137 starts. The screen B of the vendor app 137 is displayed according to a request from the vendor app 137 including parameters, and is a selecting screen to select a setting input for image processing, or an execution instruction of image processing.

(2) When a print setting/execution button B4 on the screen B of the vendor app 137 is pressed, the function providing app 136 starts to switch apps, and the setting screen C is displayed. The setting screen C is a setting input screen for image processing displayed when the setting input is selected on the screen B of the vendor app 137. Internally, an API call from the vendor app 137 with respect to the function providing app 136 is performed to start the function providing app 136.

(3) With the function providing app 136, various print settings can be made by user operations.

(4) When a start button B5 on the setting screen C of the function providing app 136 is pressed, set information in the print settings is confirmed, and print is performed.

(5) When the print is completed, apps are switched to return to the screen B of the vendor app 137.

As described above, the vendor app 137 includes the print setting button and the print execution button, or the print setting/execution button. The vendor app 137 can perform print setting or print execution just by implementing API call processing with respect to the function providing app 136 when the respective buttons are pressed.

Functions of Function Providing App

Figure 6:
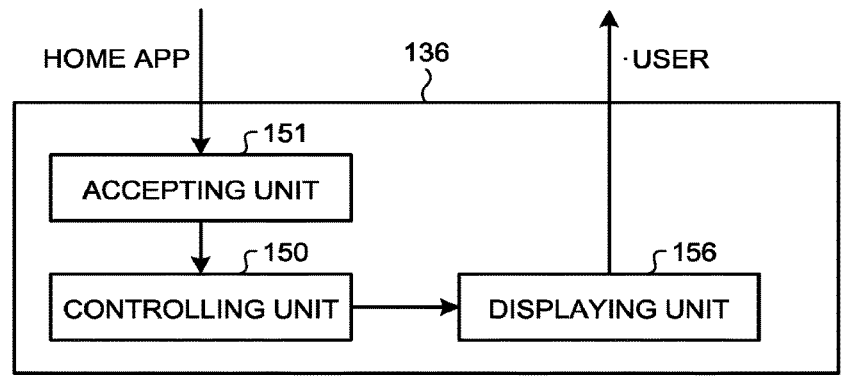
FIG. 6 is a functional block diagram of a function providing app.

FIG. 6 is a functional block diagram of the function providing app 136. The CPU 21 of the operation unit 20 implements a controlling unit 150, an accepting unit 151, and a displaying unit 156 shown in FIG. 6, for example, by executing the function providing app 136 stored in the storage unit, such as the ROM 22, the RAM 23, and the flash memory 24.

The accepting unit 151 functions as a first accepting unit, and accepts a start request that is generated when the icon of the function providing app 136 is operated, or a start request from the vendor app 137.

The controlling unit 150 functions as a first controlling unit, and performs screen display, job execution, and the like after newly accepting a call.

The displaying unit 156 functions as a first displaying unit, and performs display control of a main screen, an execution screen/error screen, and the like with respect to the operation panel 27. The displaying unit 156 performs processing of informing the vendor app 137 about settings made by a user through the execution screen/error screen, and the like.

In this example, the controlling unit 150, the accepting unit 151, and the displaying unit 156 are implemented by software, but part or all of the controlling unit 150, the accepting unit 151, and the displaying unit 156 may be implemented by hardware, such as an IC.

Moreover, the function providing app 136 may be recorded on a computer-readable recording medium, such as a compact disk read-only memory (CD-ROM) and a flexible disk (FD), to be provided. Furthermore, it may be recorded on a computer-readable recording medium, such as a compact disk recordable (CD-R), a digital versatile disk (DVD), Blu-ray disc (registered trademark), and a semiconductor memory, to be provided. Moreover, the function providing app 136 may be provided in a form of installing through a network, such as the Internet. Furthermore, the function providing app 136 may be installed on a ROM or the like in a device in advance, to be provided.

Action of Function Providing App

Figure 7:
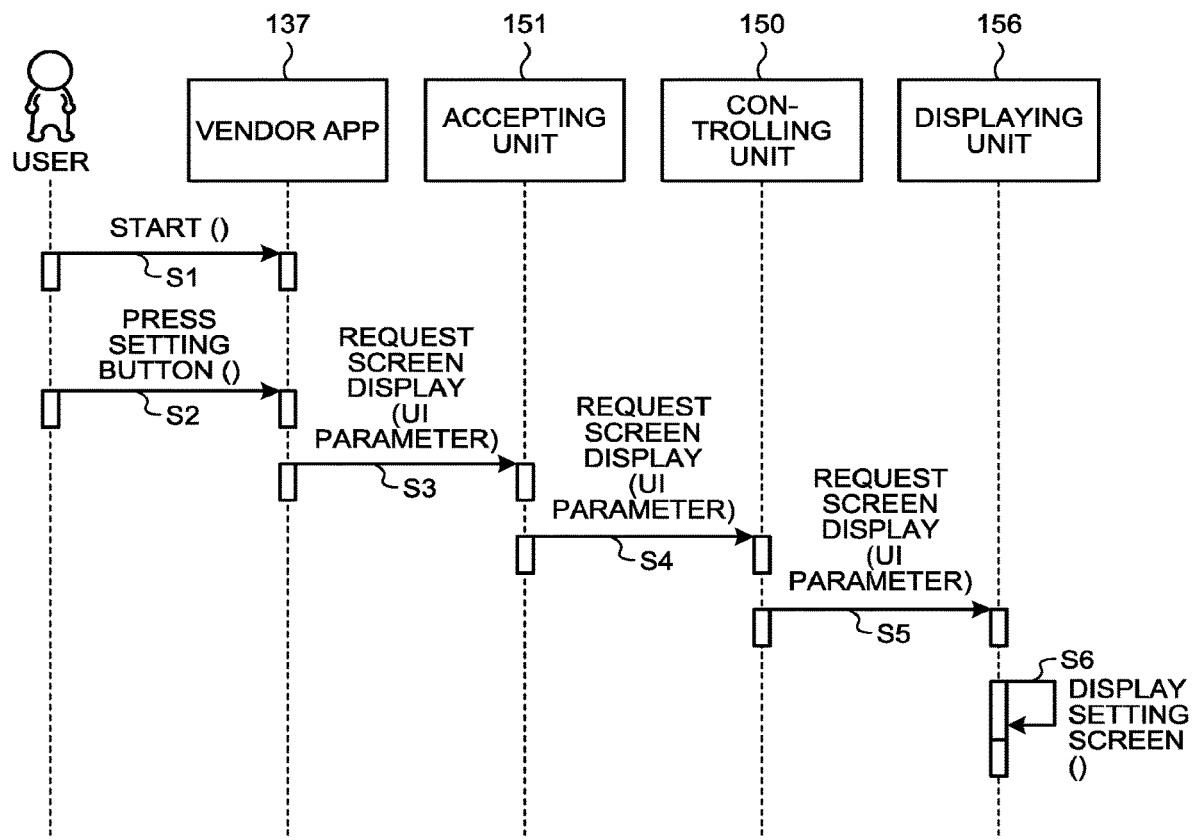
FIG. 7 is a sequence diagram showing a flow of a screen display action of the function providing app.

Next, actions of the function providing app 136 are described. FIG. 7 is a sequence diagram showing a flow of a screen display action of the function providing app 136 when setting is performed with the vendor app 137.

As shown in FIG. 7, when the vendor app 137 is started by a user through the home screen A (step S1), and the setting button B is pressed (step S2), the vendor app 137 issues a screen display request with respect to the function providing app 136 (step S3). The vendor app 137 adds a UI parameter at this time. The vendor app 137 functions as a notifying unit.

Figure 8:
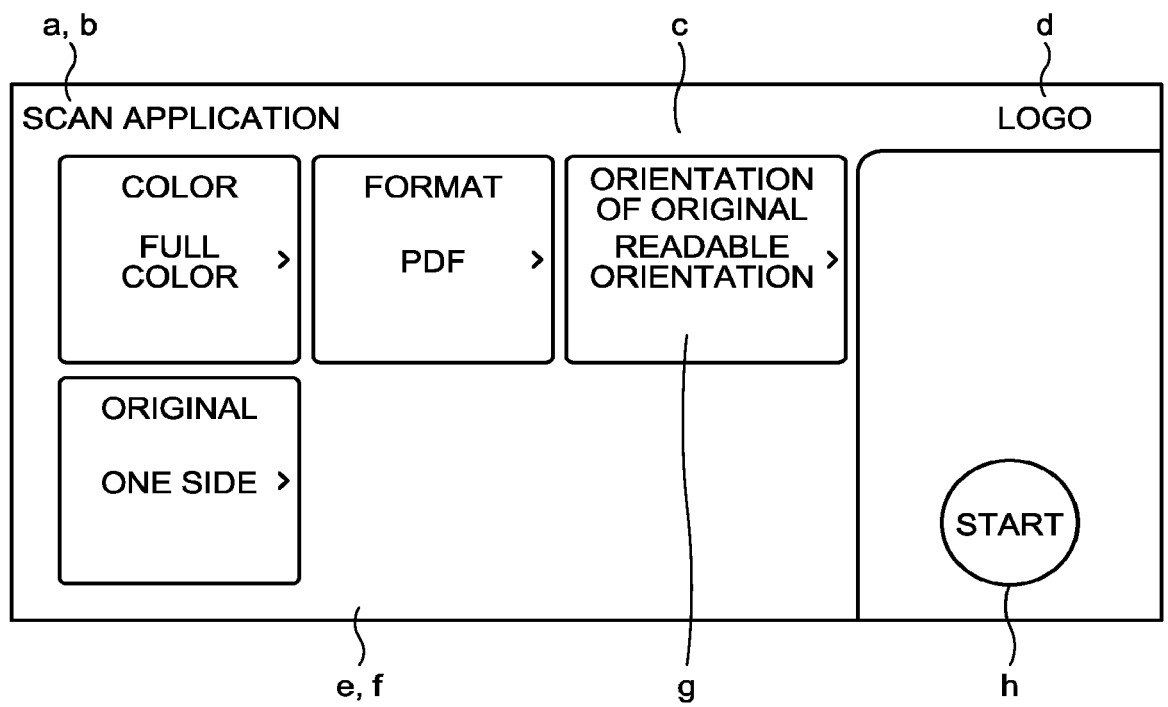
FIG. 8 is a diagram exemplarily showing UI parameters of a setting screen.

FIG. 8 is a diagram exemplarily showing the UI parameters of the setting screen C. Example of the UI parameters (UI parts) added at step S3 include the following, as shown in FIG. 8.

a title of the setting screen C (a shown in FIG. 8)

a text color of the title of the setting screen C (b shown in FIG. 8)

a background color of header (c shown in FIG. 8)

a background image (logo) of header (d shown in FIG. 8)

a background color of body (e shown in FIG. 8) 1a background image of body (f shown in FIG. 8)

visibility of a setting item (g shown in FIG. 8)

a name of a button (h shown in FIG. 8)

As for the background image, image data itself can be provided, but it is preferable to specify a file path of the image data as the data volume is large.

Subsequently, the accepting unit 151 of the function providing app 136 receives this screen display request, and issues a display request (UI parameter) of the setting screen with respect to the controlling unit 150 (step S4).

Next, the controlling unit 150 issues a display request (UI parameter) of the setting screen C with respect to the displaying unit 156 (step S5).

The displaying unit 156 then generates the setting screen C according to the acquired UI parameters to display on the operation panel 27 (step S6). More specifically, the displaying unit 156 generates and displays the setting screen C in a display appearance including at least the same background or background image same as the screen B of the vendor app 137 based on the acquired UI parameters.

FIGS. 9A and 9B are diagrams showing changing examples according to the UI parameters. FIG. 9A shows an example of changing the title a of the setting screen C. A left part of FIG. 9A shows a state before the change, and a right part shows a state after the change. Moreover, FIG. 9B shows an example of changing the background color e of the body. A left part of FIG. 9B shows a state before the change, and a right part of FIG. 9B shows a state after the change. The reason why this is done is because, for example, when the UI of the vendor app 137 of a call source is blue and the UI of the function providing app 136 is gray, it appears that the UI of the app has changed suddenly to the user, bringing a sense of incongruity to the user.

In the present embodiment, the UI when displaying the setting screen C is changed, but it is not limited thereto. For example, the UI when directly executing a job may be changed.

As described, according to the present embodiment, the vendor app 137 of a call source adds and provides information on parameters relating to a UI when the vendor app 137 calls the function providing app 136, and the function providing app 136 changes a display appearance of the UI on a screen based on the provided information on the parameters relating to the UI. Thus, display appearances of the UI of the function providing app 136 and the UI of the vendor app 137 of the call source can be consistent and, therefore, it is possible to prevent a sense of incongruity to be brought to the user.

Second Embodiment

Next, a second embodiment is described.

The second embodiment differs from the first embodiment in a point that a combination of a UI parameter and user information is stored. Hereinafter, in the description of the second embodiment, description about a point same as the first embodiment is omitted, and a point different from the first embodiment is described.

Figure 10:
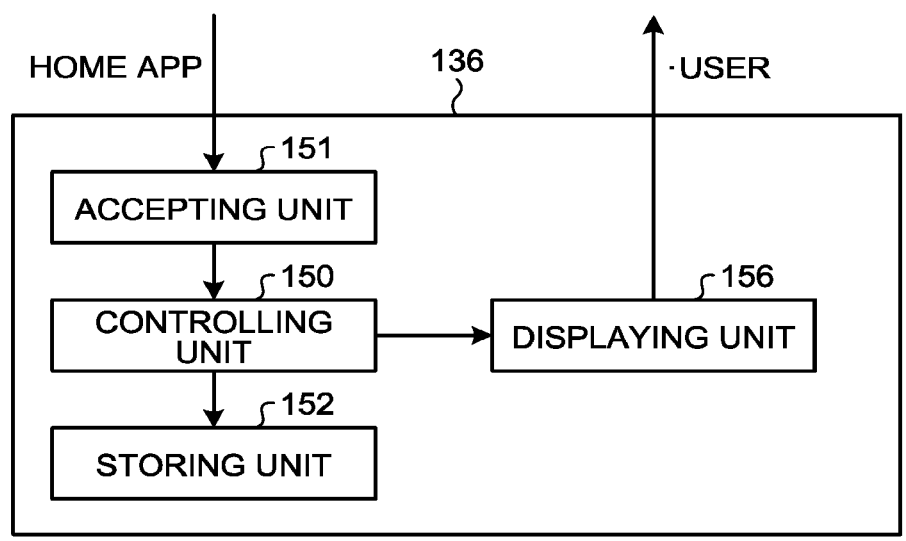
FIG. 10 is a functional block diagram of a function providing app of an MFP according to a second embodiment.

FIG. 10 is a functional block diagram of the function providing app 136 of the MFP 1 according to the second embodiment. The CPU 21 of the operation unit 20 executes the function providing app 136 stored in the storage unit, such as, the ROM 22, the RAM 23, and the flash memory 24, and thereby implements the controlling unit 150, the accepting unit 151, a storing unit 152, and the displaying unit 156 shown in FIG. 10.

The accepting unit 151 accepts a start request that is generated when the icon of the function providing app 136 is operated, or a start request from the vendor app 137.

The storing unit 152 functions as a first storing unit, and stores information in which user information and a UI parameter are associated with each other in a storage unit, such as the ROM 22, the RAM 23, and the flash memory 24.

The controlling unit 150 performs screen display, job execution, and the like after newly accepting a call.

The displaying unit 156 performs display control of a main screen, an execution screen/error screen, and the like with respect to the operation panel 27. The displaying unit 156 performs processing of informing the vendor app 137 about settings made by a user through the execution screen/error screen, and the like.

In this example, the controlling unit 150, the accepting unit 151, the storing unit 152, and the displaying unit 156 are implemented by software, but part or all out of the controlling unit 150, the accepting unit 151, the storing unit 152, and the displaying unit 156 may be implemented by hardware, such as an IC.

Action of Function Providing App

Figure 11:
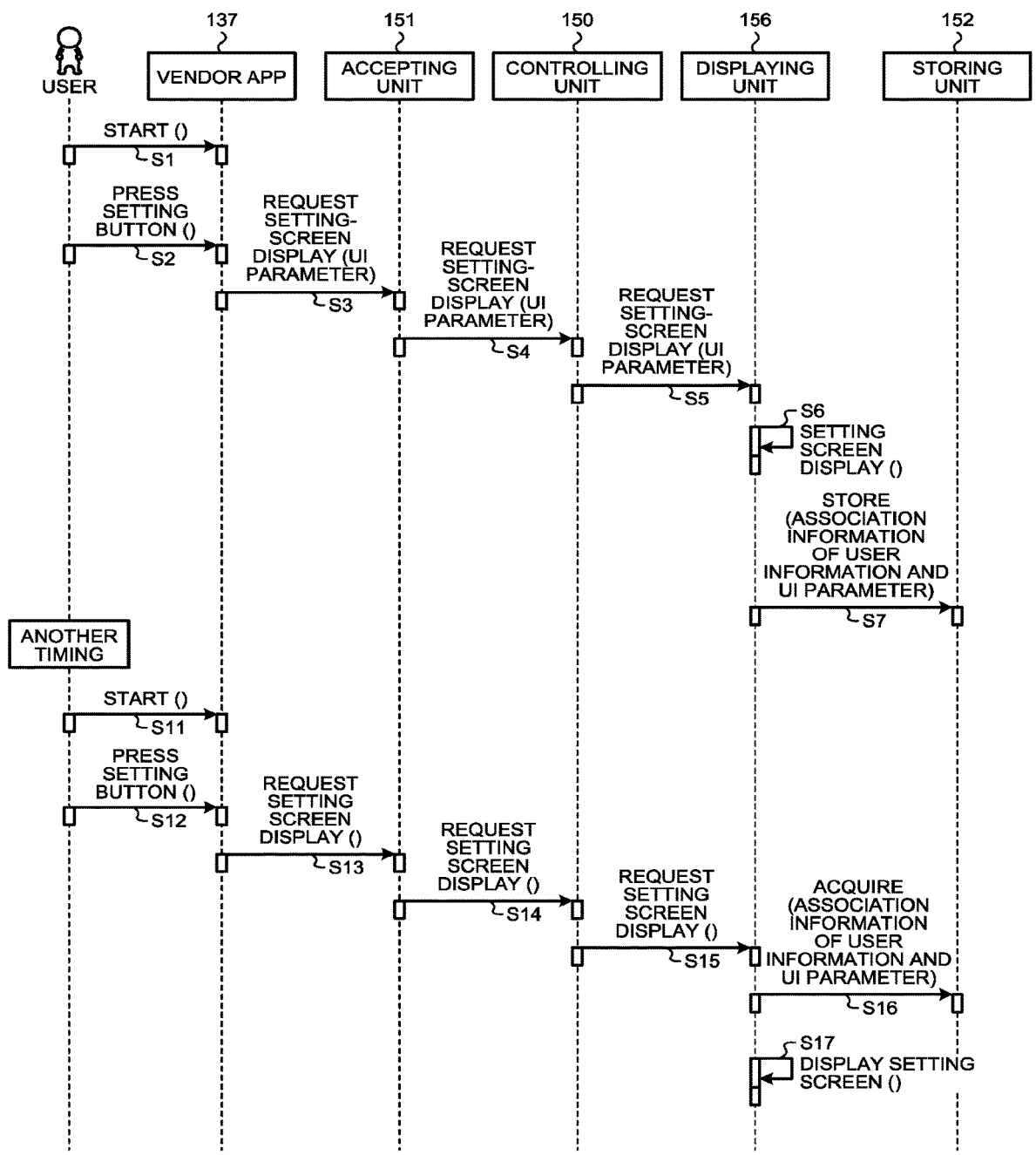
FIG. 11 is a sequence diagram showing a flow of a screen display action of the function providing app.

Next, an action of the function providing app 136 is described. FIG. 11 is a sequence diagram showing a flow of a screen display action of the function providing app 136 when settings are made with the vendor app 137.

Since steps S1 to S6 shown in FIG. 11 include nothing different from steps S1 to S6 shown in FIG. 7, the description is omitted.

When the processing at S6 is completed, the displaying unit 156 stores association information of user information and UI parameters in the storage unit through the storing unit 152 (step S7). The user information includes a card ID, user information, and the like stored in the IC card 5.

FIG. 12 is a diagram showing an example of association information of user information and UI parameters. As shown in FIG. 12, the storage unit stores UI parameters associating with user information.

Thereafter, the vendor app 137 is started by the same user through the home screen A (step S11), and when the setting button B1 is operated (step S12), the vendor app 137 issues a screen display request with respect to the function providing app 136 (step S13). However, in this case, the vendor app 137 does not add UI parameters.

Subsequently, the accepting unit 151 of the function providing app 136 receives this screen display request, and issues a display request of the setting screen C with respect to the controlling unit 150 (step S14).

Next, the controlling unit 150 issues a display request of the setting screen C to the displaying unit 156 (step S15).

The displaying unit 156 acquires association information of user information and UI parameters from the storage unit (step S16).

The displaying unit 156 then generates the setting screen C according to the acquired UI parameters, to display on the operation panel 27 (step S17).

As described, according to the present embodiment, by storing a combination of UI parameters and user information, the UI can be changed from the next time even without information on UI parameters provided. Moreover, in the case in which plural units of the MFP 1 are managed, a UI parameter notification is made at the first time, is exported to a cloud and the like, and is imported to all of the MFPs 1. Thus, the same UI can be provided to a user at any of the MFPs 1 used by the user.

Note that a user has performed a login operation using user information with respect to the MFP 1 (the image processing apparatus and the electronic device) prior to steps S1 to S7 and steps S11 to S17 in FIG. 11 in the present embodiment. The login operation to the MFP 1 (the image processing apparatus and the electronic device) includes an operation of manually inputting a user ID and a password by using the operation panel 27 or hard keys, or an operation of inputting user information by bringing the IC card 5 held by a user close to the card reader 6.

Internal or external device of the MFP 1 (the image processing apparatus and the electronic device) performs authentication processing, and performs a series of processing to return the result to the MFP 1 (the image processing apparatus and the electronic device). By these login operation and processing, the MFP 1 (the image processing apparatus and the electronic device) holds user information.

Furthermore, at the acquisition at step S16 in FIG. 11, the processing of acquiring UI parameters stored at step S7 in FIG. 11 is performed by using user information held by the MFP 1 (the image processing apparatus and the electronic device) when logging in at different timing.

Third Embodiment

In the conventional function providing apps, a problem that settings changed halfway by a user are not preserved/restored occurs when the job execution function is called by multiple vendor apps, as the substance of the function providing app is only one. A third embodiment differs from the first embodiment and the second embodiment in a point that job settings changed halfway by a user can be preserved/restored also when the function providing app 136 is called by the multiple vendor apps 137. Hereinafter, in the description of the third embodiment, description about a point same as the first embodiment or the second embodiment is omitted, and a point different from the first embodiment and the second embodiment is described.

Figure 13:
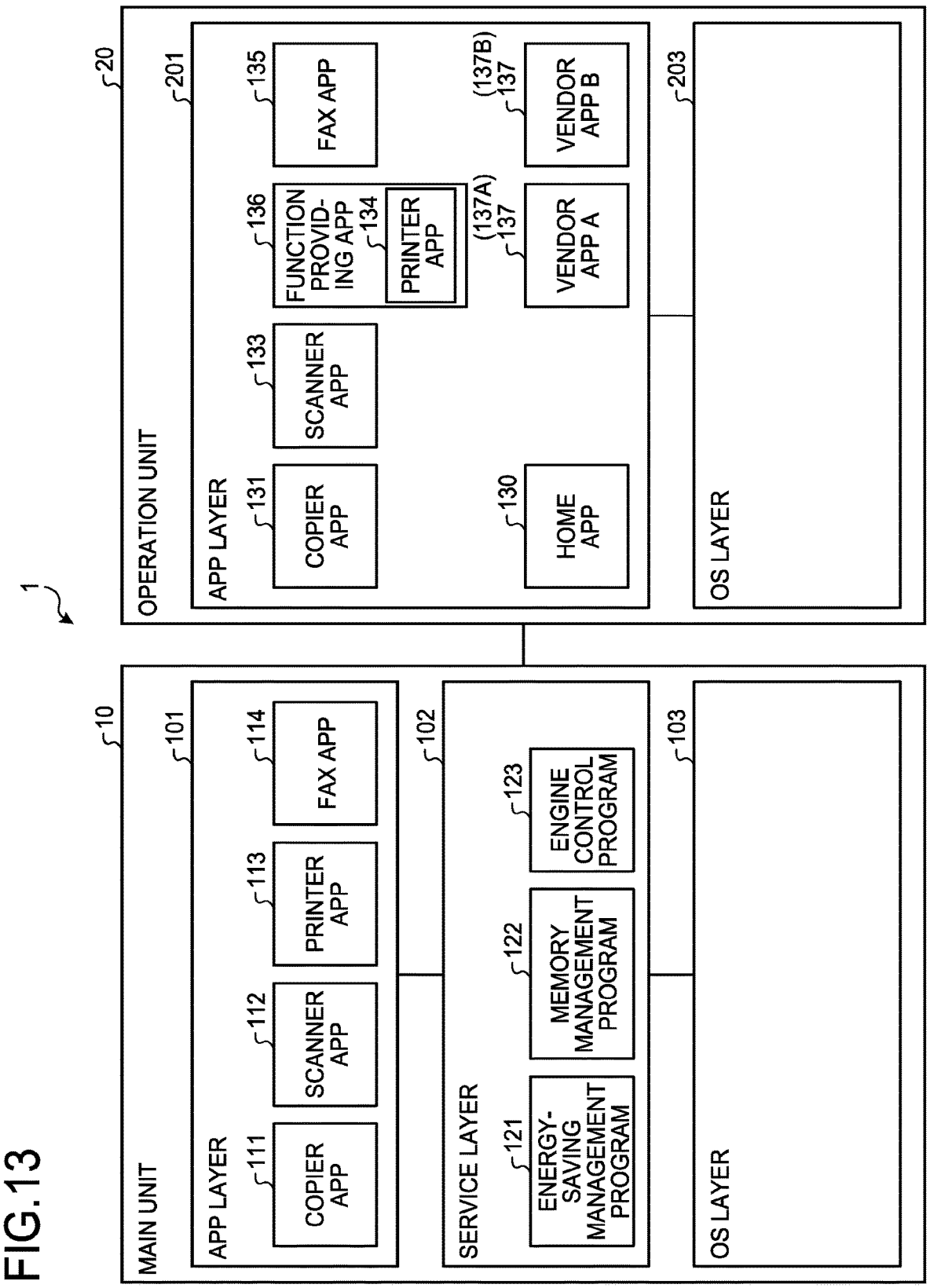
FIG. 13 is a diagram showing an example of software installed on an MFP according to a third embodiment.

FIG. 13 is a diagram showing an example of software installed on the MFP 1 according to the third embodiment. As shown in FIG. 13, in the present embodiment, apps of the operation unit include more than one vendor app 137 developed by a development vendor for the scanner app, and the like. In the present embodiment, a vendor app A 137A and a vendor app B 137B are included.

Figure 14:
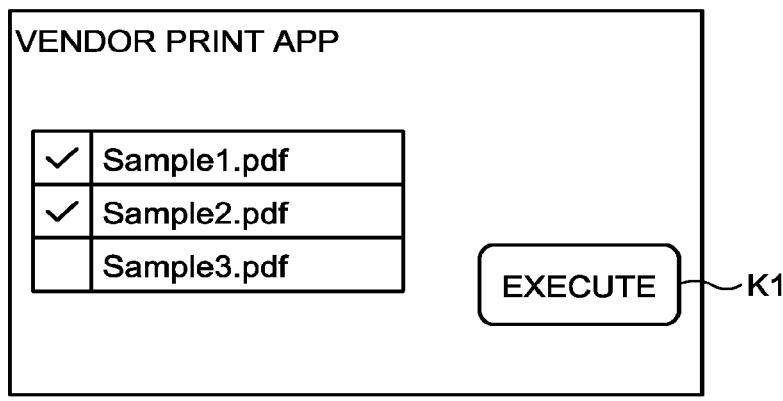
FIG. 14 is a diagram showing an example of a screen of a vendor app.

FIG. 14 is a diagram showing an example of a screen of the vendor app 137. A screen of the vendor app 137 shown in FIG. 14 is an example of a screen in which a file of an object to be printed is selected. The screen in FIG. 14 is a screen to select a file of an object to be printed and then to press an execute key K1 on a screen of the vendor app (vendor print app) 137. As shown in FIG. 14, it may be configured such that more than one file to be printed is selectable. Note that it is preferable that the execute key K1 be dimmed and be unselectable when no file is selected.

As shown in FIG. 14, when a file of an object to be printed is selectable on a screen of the vendor app 137, settings of the print settings and execution of print may be performed per file or collectively for multiple files. In this case, for example, by pressing the print setting button B1 after a file for which the print settings are to be changed is selected on the screen B shown in 4, the print settings of the file can be changed. Note that when multiple files are selected, the same print settings can be set for the files to be printed.

Function of Function Providing App

Figure 15:
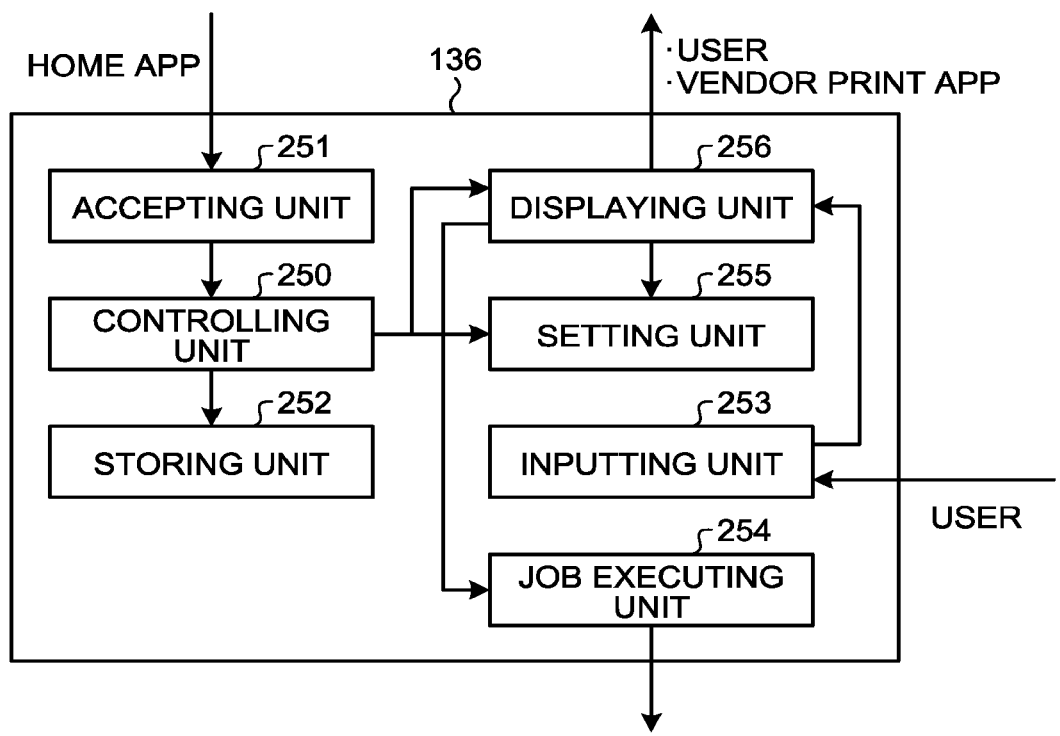
FIG. 15 is a functional block diagram of the function providing app.

FIG. 15 is a functional block diagram of the function providing app 136. The CPU 21 of the operation unit 20 implements a controlling unit 250, an accepting unit 251, a storing unit 252, an inputting unit 253, a job executing unit 254, a setting unit 255, and a displaying unit 156 as shown in FIG. 15, for example, by executing the function providing app 136 stored in the storage unit, such as the ROM 22, the RAM 23, and the flash memory 24.

The accepting unit 251 functions as a second accepting unit, and accepts a start request that is generated when the icon of the function providing app 136 is operated, or a start request from the vendor app 137.

The storing unit 252 functions as a second storing unit, and performs a storage control and a read control of information corresponding to an app for which the start request is issued, information about a call source (information indicating whether it is started as a standard-equipped app or to provide a function to a vendor), setting values, status information, and the like with respect to the storage unit, such as the ROM 22, the RAM 23, and the flash memory 24.

The controlling unit 250 functions as a second controlling unit, and controls the storing unit 252 to retrieve information on an app being called, compares with an app of a new call source, and performs screen display, job execution, and the like after newly accepting a call.

The inputting unit 253 accepts an input by a user to a screen displayed on the operation panel 27 according to the operation to the operation panel 27 by the user.

The displaying unit 256 functions as a second displaying unit, and performs display control of a main screen, a job setting/execution screen, and the like with respect to the operation panel 27. The displaying unit 256 performs processing of informing the vendor app 137 about settings made by a user through the job setting/execution screen, and the like.

The setting unit 255 changes job setting information according to display contents of the job setting/execution screen to conform to the specification of the MFP 1, and adjusts setting values. In the adjustment, setting values that have been set are automatically changed according to equipped functions, that is, the specification of the MFP 1, such as whether a monochrome printing is possible, whether color printing is possible, whether one-sided printing is possible, and two-sided printing is possible. For example, when an input to set to color printing is received while being capable of only monochromatic printing, processing to change the print setting value from color printing to monochromatic printing to make the value according the specification or to reduce the value is automatically performed.

The job executing unit 254 issues a job execution request for a desirable action by using the setting value defined in the copier app 111, the scanner app 112, or the like of the main unit 10.

The controlling unit 250 to the displaying unit 256 are implemented by software in this example, but part or all of the controlling unit 250 to the displaying unit 256 may be implemented by hardware, such as an IC.

Moreover, the function providing app 136 may be recorded on a computer-readable recording medium, such as a CD-ROM and an FD, to be provided. Furthermore, it may be recorded on a computer-readable recording medium, such as a CD-R, a DVD, Blu-ray disc (registered trademark), and a semiconductor memory, to be provided. Moreover, the function providing app 136 may be provided in a form of installing through a network, such as the Internet. Furthermore, the function providing app 136 may be installed on a ROM or the like in a device in advance, to be provided.

Action of Function Providing App

Figure 16:
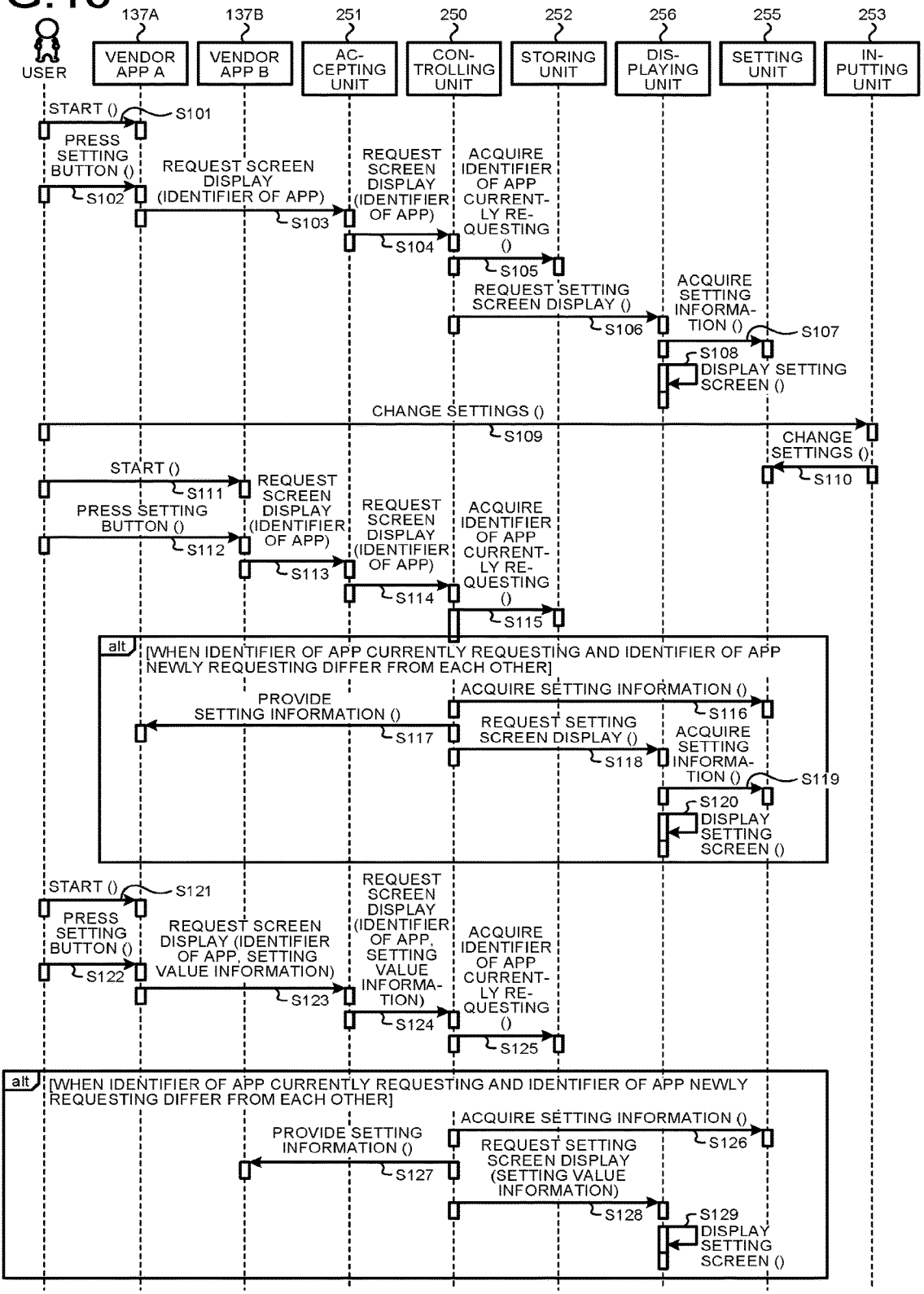
FIG. 16 is a sequence diagram showing a flow of a screen display action of the function providing app.

Next, an action of the function providing app 136 is described. FIG. 16 is a sequence diagram showing a flow of a screen display action of the function providing app 136 when settings are made with the vendor app 137. The sequence diagram shown in FIG. 16 is a sequence in which operations, "1. calling the function providing app from the vendor app A and changing settings", "2. calling the function providing app from the vendor app B", and "3. calling the function providing app from the vendor app A" are sequentially performed, and in which the settings changed at 1 are restored at 3.

That is, the vendor app A 137A is started through a home screen by a user (step S101) and the setting button is operated (step S102), the vendor app A 137A issues a screen display request to the function providing app 136 (step S103). Note that the vendor app A 137A adds, at this time, an identifier of the vendor app A 137A to a parameter. The vendor app 137 functions as a notifying unit.

FIG. 17 is a diagram showing an example of an identifier of the vendor app. As long as the identifier enables to identify the vendor app uniquely, the identifier of the vendor app may be any identifier. As shown in FIG. 17, the identifier of the vendor app may be, for example, a package name of the vendor app.

The accepting unit 251 of the function providing app 136 receives this screen display request, and issues a screen display request of the vendor app A 137A to the controlling unit 250 (step S104).

The controlling unit 250 instructs the storing unit 252 to store the identifier of the vendor app A 137A (step S105). Having stored the identifier of the vendor app A 137A, the controlling unit 250 issues a display request of the setting screen to the displaying unit 256 (step S106).

The controlling unit 250 may cause the storing unit 252 to store current setting items in addition to the identifier of the vendor app A 137A. FIG. 18 is a diagram showing an example of an identifier of the vendor app and setting items. As shown in FIG. 18, by storing the setting items associating with the identifier of the vendor app, the setting screen can be restored even when the screen of the function providing app 136 is unintentionally discarded. A case of storing print settings as the setting item is shown in FIG. 18 as an example, but copy settings are stored when a job requested by the vendor app A 137A is a copy job, scan settings are stored when the requested job is a scan job, and FAX settings are stored when the requested job is a FAX job, as the setting item.

The displaying unit 256 accesses the setting unit 255 to acquire job setting information (step S107). Thereafter, the displaying unit 256 displays a setting screen on the operation panel 27 based on the acquired job setting information (step S108).

In the case in which previous job setting information is not stored as a case of an initial activation of the vendor app, and the like, the displaying unit 256 displays the setting screen according to default job setting information.

Next, when a setting change operation is performed by a user through the operation panel 27 as shown at step S109, the inputting unit 253 transmits job setting information input by the user to the setting unit 255. The setting unit 255 temporarily stores the job setting information and the like set by the user in a storage unit, such as the RAM 23.

A case in which the vendor app B 137B calls the function providing app 136 while the other vendor app A 137A has already been calling the function providing app 136 is described herein.

When the vendor app B 137B is started through the home screen by the user in a state in which the vendor app A 137A has already been calling the function providing app 136 (step S111) and the setting button is operated (step S112), the vendor app B 137B issues a screen display request with respect to the function providing app 136 (step S113). The vendor app B 137B adds an identifier of the vendor app B 137B to a parameter at this time. The accepting unit 251 of the function providing app 136 receives this screen display request, and issues a screen display request of, for example, the vendor app B 137B with respect to the controlling unit 250 (step S114).

Next, the controlling unit 250 acquires an identifier of the vendor app currently requesting (the vendor app A 137A) (step S115).

When the identifier of the vendor app currently requesting (the vendor app A 137A) and the identifier of the vendor app newly sending a request (the identifier of the vendor app B 137B) differ from each other, the controlling unit 250 acquires current job setting information from the setting unit 255 (step S116).

In addition, the controlling unit 250 informs the vendor app A 137A currently requesting, about the current job setting information with respect to (step S117). That is, the controlling unit 250 returns the current job setting information to the vendor app A 137A.

The current job setting information provided at step S117 is only required to be information understandable by the function providing app 136, and it is not necessary for the vendor app to get contents (a format and the like) of the information.

Thereafter, the controlling unit 250 issues a display request of the setting screen with respect to the displaying unit 256 (step S118).

The displaying unit 256 acquires the job setting information by accessing the setting unit 255 (step S119). Since a new screen is to be remade herein, the job setting information is to be acquired again. Thereafter, the displaying unit 256 displays the setting screen on the operation panel 27 (step S120).

Furthermore, a case in which the vendor app A 137A calls the function providing app 136 in a state in which the other vendor app B 137B has already been calling the function providing app 136 is described.

When the vendor app A 137A is started through the home screen by the user in a state in which the vendor app B 137B has already been calling the function providing app 136 (step S121) and the setting button is operated (step S122), the vendor app A 137A issues a screen display request with respect to the function providing app 136 (step S123). The vendor app A 137A adds an identifier of the vendor app A 137A and the job setting information returned at step S117 to parameters at this time. That is, the vendor app A 137A sets the job setting information returned at step S117 as they are as parameters at the screen display request at step S123.

The accepting unit 251 of the function providing app 136 receives this screen display request, and issues a screen display request of, for example, the vendor app A 137A with respect to the controlling unit 250 (step S124).

Next, the controlling unit 250 acquires an identifier of the vendor app currently requesting (the identifier of the vendor app B 137B) (step S125).

When the identifier of the vendor app currently requesting (the identifier of the vendor app B 137B) and the identifier of the vendor app newly sending a request (the identifier of the vendor app A 137A) differ from each other, the controlling unit 250 acquires current job setting information from the setting unit 255 (step S126).

In addition, the controlling unit 250 informs the vendor app B 137B currently requesting, about the current job setting information to (step S127). That is, the controlling unit 250 returns the current job setting information to the vendor app B 137B.

Thereafter, the controlling unit 250 issues a display request of the setting screen with respect to the displaying unit 256 (step S128). At this time, the controlling unit 250 adds the displayed job setting information (the job setting information returned at step S117) to parameters.

The displaying unit 256 displays the setting screen on the operation panel 27 according to the job setting information returned at step S117 (step S129).

As described, according to the present embodiment, when the vendor app B 137B calls the function providing app 136 in a state in which the other vendor app A 137A has already been calling the function providing app 136, the current job setting information is provided to the vendor app A 137A that has called the function providing app 136 first. The vendor app A 137A sends, to the function providing app 136, the job setting information that has been given by the function providing app 136 next time the vendor app A 137A is called. Therefore, even when the multiple vendor apps 137 call the function providing app 136, job setting that has been changed halfway by a user can be preserved/restored.

Fourth Embodiment

Next, a fourth embodiment is described.

The fourth embodiment differs from the third embodiment in a point that notification of necessity of retry is made together with notification of the job setting information when the job setting information is provided to vendor app 137 currently requesting. Hereinafter, in the description of the fourth embodiment, description about a point same as the third embodiment is omitted, and a point different from the third embodiment is described.

Figure 19:
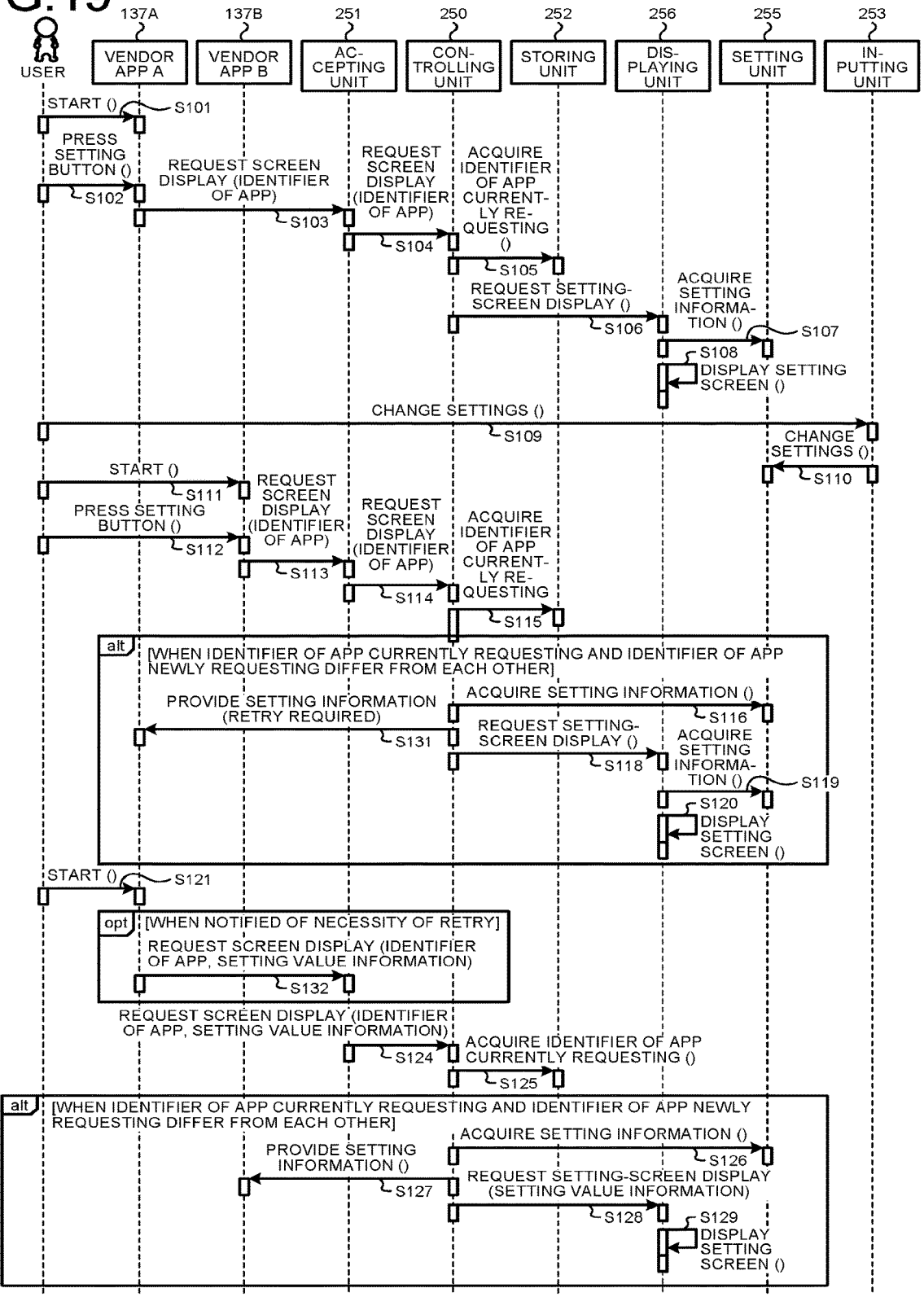
FIG. 19 is a sequence diagram showing a flow of a setting screen display action of the function providing app according to a fourth embodiment.

FIG. 19 is a sequence diagram showing a flow of a setting screen display action of the function providing app 136 according to the fourth embodiment.

The sequence diagram shown in FIG. 19 is a sequence in which operations, "1. calling the function providing app from the vendor app A and changing settings", "2. calling the function providing app from the vendor app B", and "3. calling the function providing app from the vendor app A" are sequentially performed, and in which the settings changed at 1 is restored at 3.

Since steps S111 to S115 shown in FIG. 19 include nothing different from steps S101 to S115 shown in FIG. 16, the description is omitted.

When the identifier of the vendor app currently requesting (the identifier of the vendor app A 137A) and the identifier of the vendor app newly sending a request (the identifier of the vendor app B 137B) differ from each other, the controlling unit 250 acquires current job setting information from the setting unit 255 (step S116).

In addition, as shown in FIG. 19, the controlling unit 250 gives the current job setting information to the vendor app A 137A currently requesting (step S131). That is, the controlling unit 250 returns the current job setting information to the vendor app A 137A. In addition, the controlling unit 250 gives a parameter of retry required.

Thereafter, the controlling unit 250 issues a display request of the setting screen with respect to the displaying unit 256 (step S118).

The displaying unit 256 acquires the job setting information by accessing the setting unit 255 (step S119). Since a new screen is to be remade herein, the job setting information is to be acquired again. Thereafter, the displaying unit 256 displays the setting screen on the operation panel 27 (step S120).

Furthermore, a case in which the vendor app A 137A calls the function providing app 136 in a state in which the other vendor app B 137B has already been calling the function providing app 136 is described.

When the vendor app A 137A is started through the home screen by a user in a state in which the vendor app B 137B has already been calling the function providing app 136 (step S121), as shown in FIG. 19, the vendor app A 137A issues, when having accepted notification of retry required, a screen display request with respect to the function providing app 136 (step S132). While it is configured to issue the screen display request with respect to the function providing app 136 based on an operation of the setting button (step S122) as a trigger in the third embodiment, it is configured to issue a screen display request automatically with respect to the function providing app 136 in the present embodiment.

Since steps S124 to S129 shown in FIG. 19 include nothing different from steps S124 to S129 shown in FIG. 16, the description is omitted.

As described, according to the present embodiment, if the function providing app 136 has been opened from the vendor app 137 once, it is possible to open the function providing app 136 automatically when the vendor app 137 is opened again.

For example, when multiple apps are activated due to a reason originated from the specification of a general-purpose OS and an app activated first is running background, a screen (activity) of the app activated first can be discarded. According to the present embodiment, even when the displayed screen is discarded because of these reasons, a retry control can be performed automatically, and a setting screen that has been input/displayed through the app activated first can be displayed again with setting values initially set.

Fifth Embodiment

Next, a fifth embodiment is described.

The fifth embodiment differs from the third embodiment or the fourth embodiment in a point that a user is properly notified of an error when an error occurs in a job executed by calling the function providing app 136. Hereinafter, in the description of the fifth embodiment, description about a point same as the third embodiment or the fourth embodiment is omitted, and a point different from the third embodiment or the fourth embodiment is described.

Figure 20:
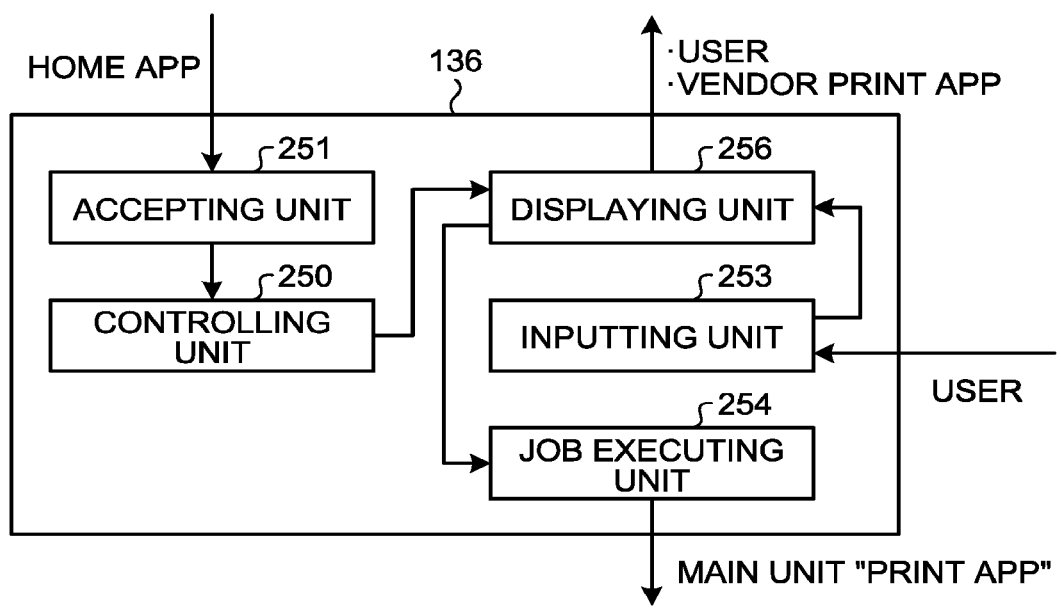
FIG. 20 is a functional block diagram of a function providing app of an MFP according to a fifth embodiment.

FIG. 20 is a functional block diagram of a function providing app of the MFP 1 according to the fifth embodiment. The CPU 21 of the operation unit 20 implements the controlling unit 150, the accepting unit 151, the inputting unit 253, the job executing unit 254, and the displaying unit 156 as shown in FIG. 20, for example, by executing the function providing app 136 stored in the storage unit, such as the ROM 22, the RAM 23, and the flash memory 24.

The accepting unit 251 accepts a start request that is generated when the icon of the function providing app 136 is operated, or a start request from the vendor app 137.

The controlling unit 250 performs screen display, job execution, and the like after newly accepting a call.

The inputting unit 253 accepts an input by a user to a screen displayed on the operation panel 27 according to the operation with respect to the operation panel 27 by the user.

The displaying unit 256 performs display control of an execution screen/error screen, and the like with respect to the operation panel 27. The displaying unit 256 performs processing of informing the vendor app 137 about settings made by a user through the execution screen/error screen, and the like.

The job executing unit 254 issues a job execution request for a desirable action by using the setting value defined in the copier app 111, the scanner app 112, or the like of the main unit 10.

The controlling unit 250, the accepting unit 251, the inputting unit 253, the job executing unit 254, and the displaying unit 256 are implemented by software in this example, but part or all of the controlling unit 250, the accepting unit 251, the inputting unit 253, the job executing unit 254, and the displaying unit 256 may be implemented by hardware, such as an IC.

Action of Function Providing App

Figure 21:
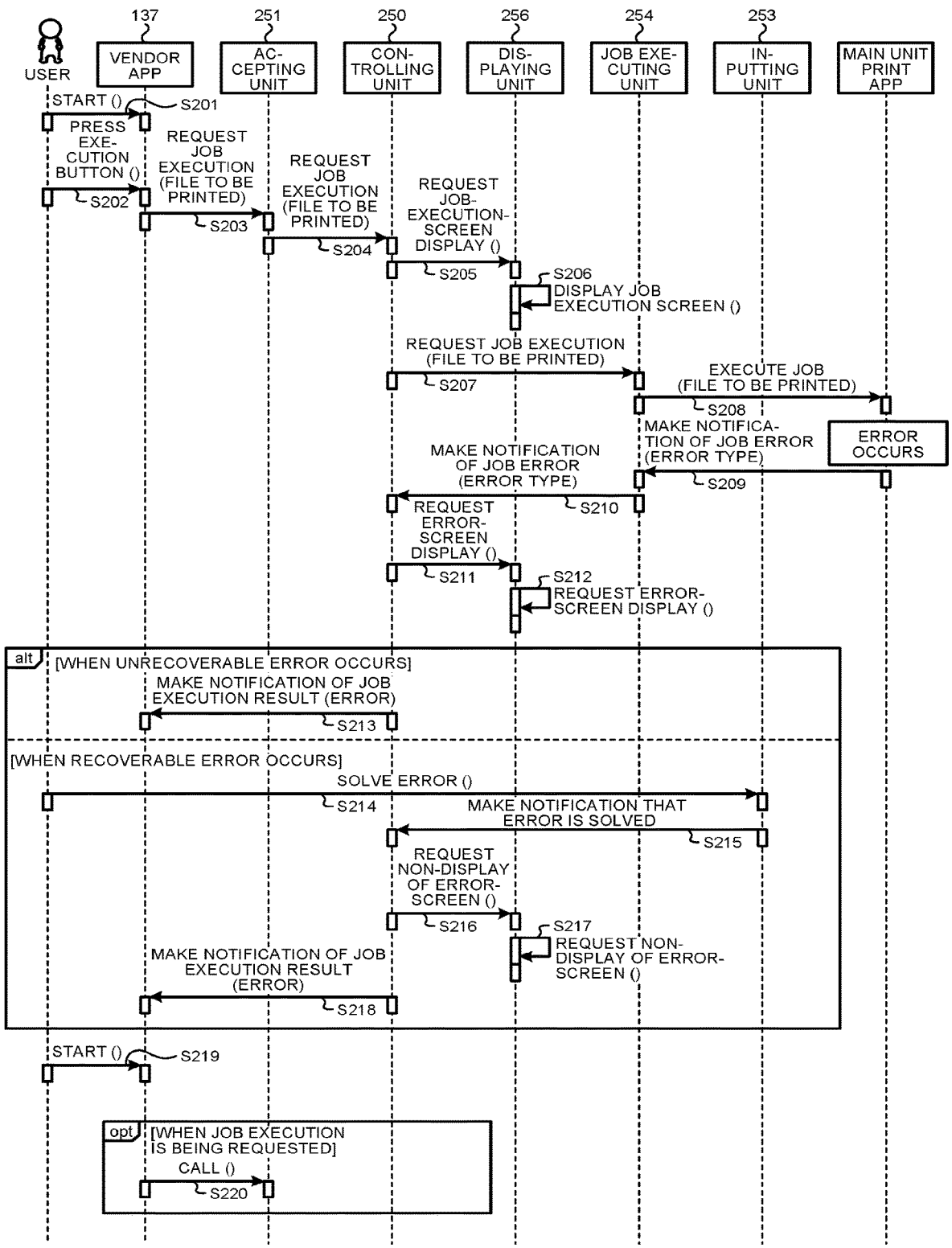
FIG. 21 is a sequence diagram showing a flow of a screen display action of the function providing app.

Next, an action of the function providing app 136 is described. FIG. 21 is a sequence diagram showing a flow of a screen display action of the function providing app 136 when a job is executed with the vendor app 137. In the following, a case of executing a print job is described as an example, but a case of executing another job, such as a copy job, a scan job, and a FAX job, can also be processed similarly.

As shown in FIG. 21, when the vendor app 137 is started by a user through the home screen A (step S201) and the execution button B2 is operated (step S202), the vendor app 137 issues a job execution request with respect to the function providing app 136 (step S203). The vendor app 137 may add information on a file to be printed to parameters at this time. The information on a file to be printed may include print settings.

Subsequently, the accepting unit 251 of the function providing app 136 receives this job execution request, and issues a job execution request (information on a file to be printed) with respect to the controlling unit 150 (step S204).

Next, the controlling unit 250 issues a job-execution-screen display request with respect to the displaying unit 256 (step S205).

The displaying unit 256 generates the print execution screen D to display on the operation panel 27 (step S206).

Subsequently, the controlling unit 250 issues a job execution request (information on a file to be printed) with respect to the job executing unit 254 (step S207).

The job executing unit 254 performs job execution with respect to the print app of the main unit 10 (step S208).

A case in which an error occurs is described herein.

When an error occurs, the print app of the main unit 10 notifies the job executing unit 354 of the function providing app 136 of a job error (step S209). The print app of the main unit 10 adds an error type to parameters at this time.

The job executing unit 254 receives this job error (error type), and notifies the controlling unit 250 of the job error (error type) (step S210).

Next, the controlling unit 250 issues an error-screen display request to the displaying unit 256 (step S211).

The displaying unit 356 then generates an error screen to display on the operation panel 27 (step S212).

In the present embodiment, the behavior of the function providing app 136 varies according to an error type of an error that has occurred as follows.

Error Type: Case of Unrecoverable Error

For example, a failure of a plotter device, which is the engine 17 of the main unit 10, a failure of a scanner device, and the like correspond to this type.

In a case of an unrecoverable error, upon issuing an error-screen display request to the displaying unit 256 as described above (step S211), the controlling unit 250 makes job-execution result notification to the vendor app 137 (step S213). At this time, the controlling unit 250 adds an error to parameters.

Figure 22:
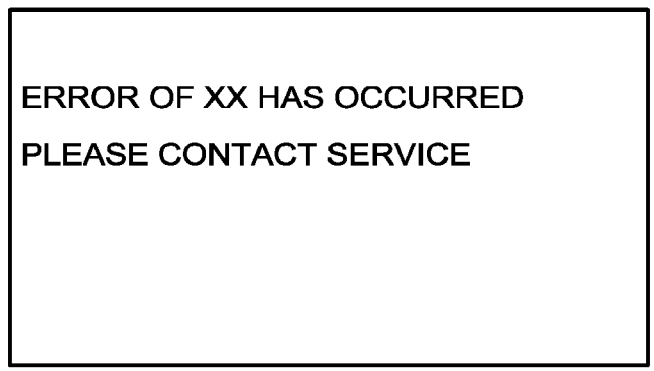
FIG. 22 is a diagram showing an example of an error screen when an unrecoverable error occurs.

FIG. 22 is a diagram showing an example of an error screen when an unrecoverable error occurs. As shown in FIG. 22, an error screen with "An error has occurred. Please contact service" is displayed when an unrecoverable error occurs.

When an unrecoverable error is occurring, a user cannot solve the error. Therefore, in this case, upon occurring the error, the job-execution result notification is made to the vendor app 137. Thereby, the function providing app 136 is non-displayed, which enables to avoid calling the function providing app 136 even when the vendor app 137 is started again (step S220 in the sequence described later is not performed).

This behavior assumes a case in which the vendor app 137 calls multiple functions in the function providing app 136. For example, when the vendor app 137 uses the functions of scan and print, there is a case in which even when an unrecoverable error occurs on the scan side, the print is available. In such a case, if the error screen of the scan always appears when the vendor app 137 is started, the printer function cannot be used. For the above reason, when an unrecoverable error occurs, the job-execution result notification is provided immediately, thereby making other functions usable.

Error Type: Case of Recoverable Error)

For example, paper jam, memory full, and the like in a plotter device, which is the engine 17 of the main unit 10 correspond to this type.

In a case of a recoverable error, the controlling unit 250 issues an error-screen display request to the displaying unit 256 as described above (step S211), and then becomes standby to wait until the error is solved by a user (step S214).

Figure 23A:
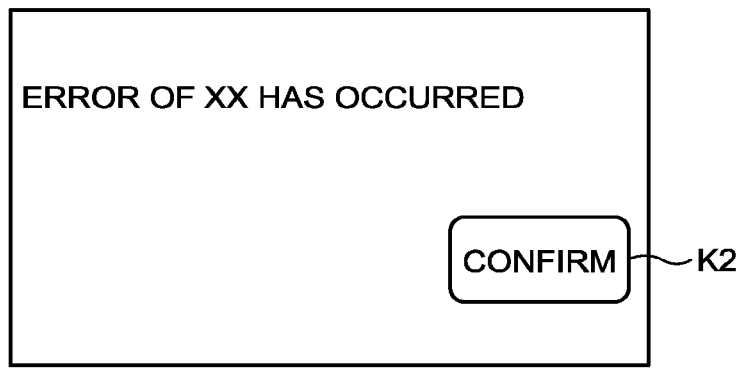
FIGS. 23A and 23B are diagrams showing examples of error screens when a recoverable error occurs.
Figure 23B:
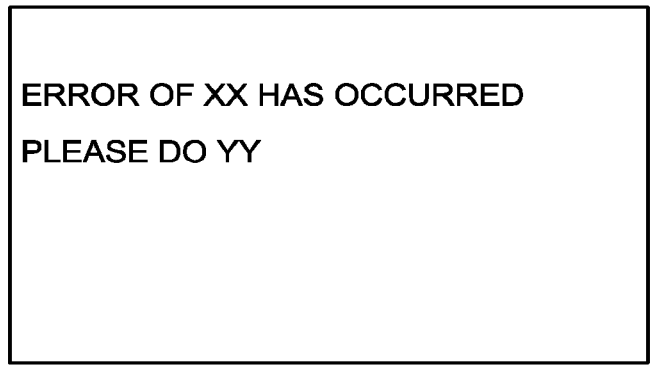

FIGS. 23A and 23B are diagrams showing examples of error screens when a recoverable error occurs. An error screen shown in FIG. 23A is a screen that is displayed in the case of an error for which a user action is not necessary to be solved (for example, memory full and the like). In this case, the job-execution result notification is made with respect to the vendor app 137, triggered by pressing of a confirm key K2 by the user. An error screen shown in FIG. 23B is a screen that is displayed in the case of an error for which a user action is necessary to be solved (for example, when a jam occurs). In this case, by performing a solving action (removing jammed paper, or the like), the job-execution result notification is made with respect to the vendor app 137.

When there is an input indicating that the user has removed the error, the inputting unit 253 notifies the controlling unit 250 that the error is solved (step S215).

The controlling unit 250 issues an error-screen non-display request with respect to the displaying unit 256 (step S216).

The displaying unit 256 then cause the error screen displayed on the operation panel 27 to be non-displayed (step S217).

Subsequently, the controlling unit 250 makes the job-execution result notification to the vendor app 137 (step S218). At this time, the controlling unit 250 adds the error to parameters.

When the vendor app 137 is started through the home screen A by the user (step S219), the vendor app 137 calls the function providing app 136 when job execution is being requested (step S220).

The reason why it is configured as such is because when a recoverable error is occurring, it is necessary to have a user solve the error and, therefore, it is necessary to display the error screen even when the function providing app 136 is once non-displayed and the vendor app 137 is displayed again. To keep the job execution being requested until the error is solved and to have the function providing app 136 called from the vendor app 137, the job-execution result notification is made after the error is solved.

An action of the vendor app 137 that receives the job-execution result notification at step S213 is described herein.

Figure 24:
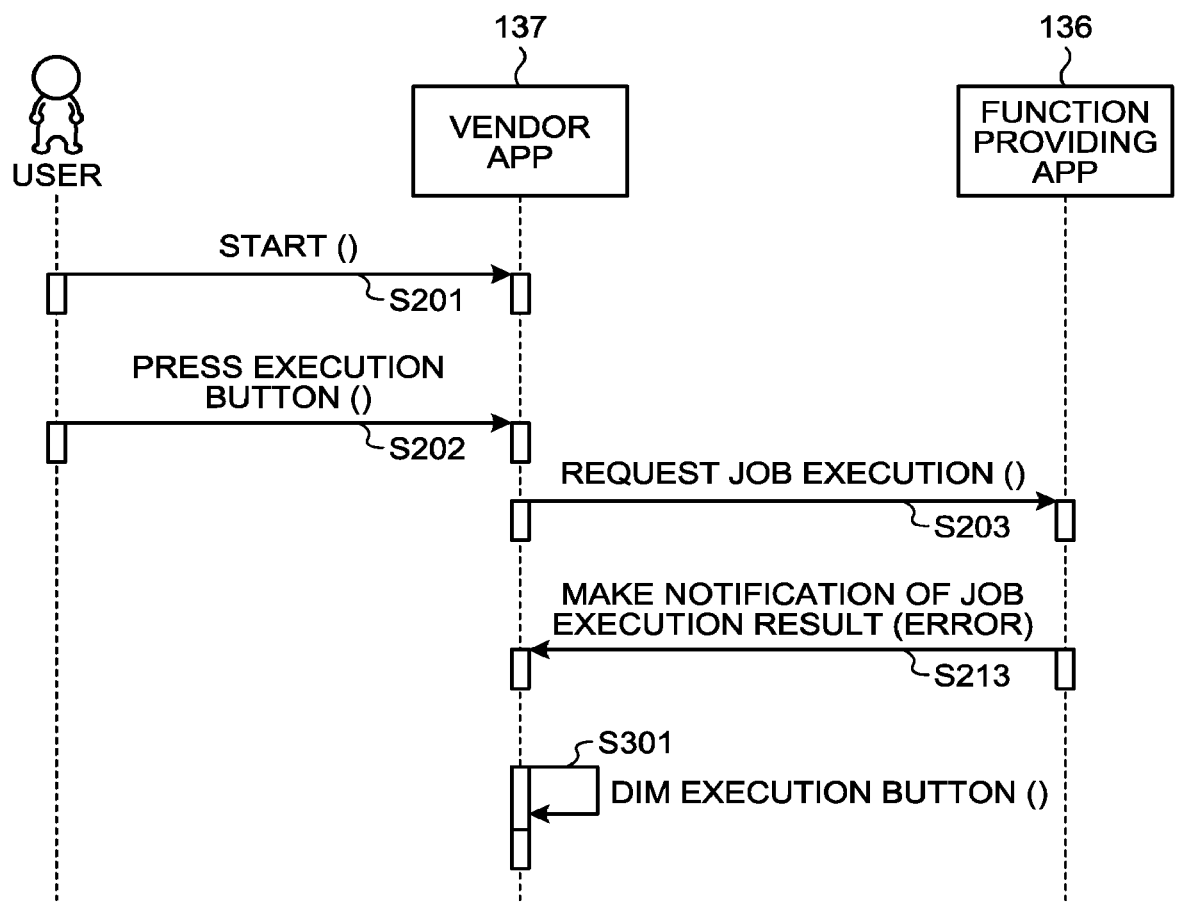
FIG. 24 is a sequence diagram showing an example of an action of the vendor app when notified of an unrecoverable error.

FIG. 24 is a sequence diagram showing an example of an action of the vendor app 137 when notified of an unrecoverable error.

As shown in FIG. 24, when an error, notification of which is received, is an unrecoverable critical error, the vendor app 137 dims the execution button B2 to be unpressable because it is helpless even if the vendor app 137 calls the function providing app 136 again (step S301).

Figure 25:
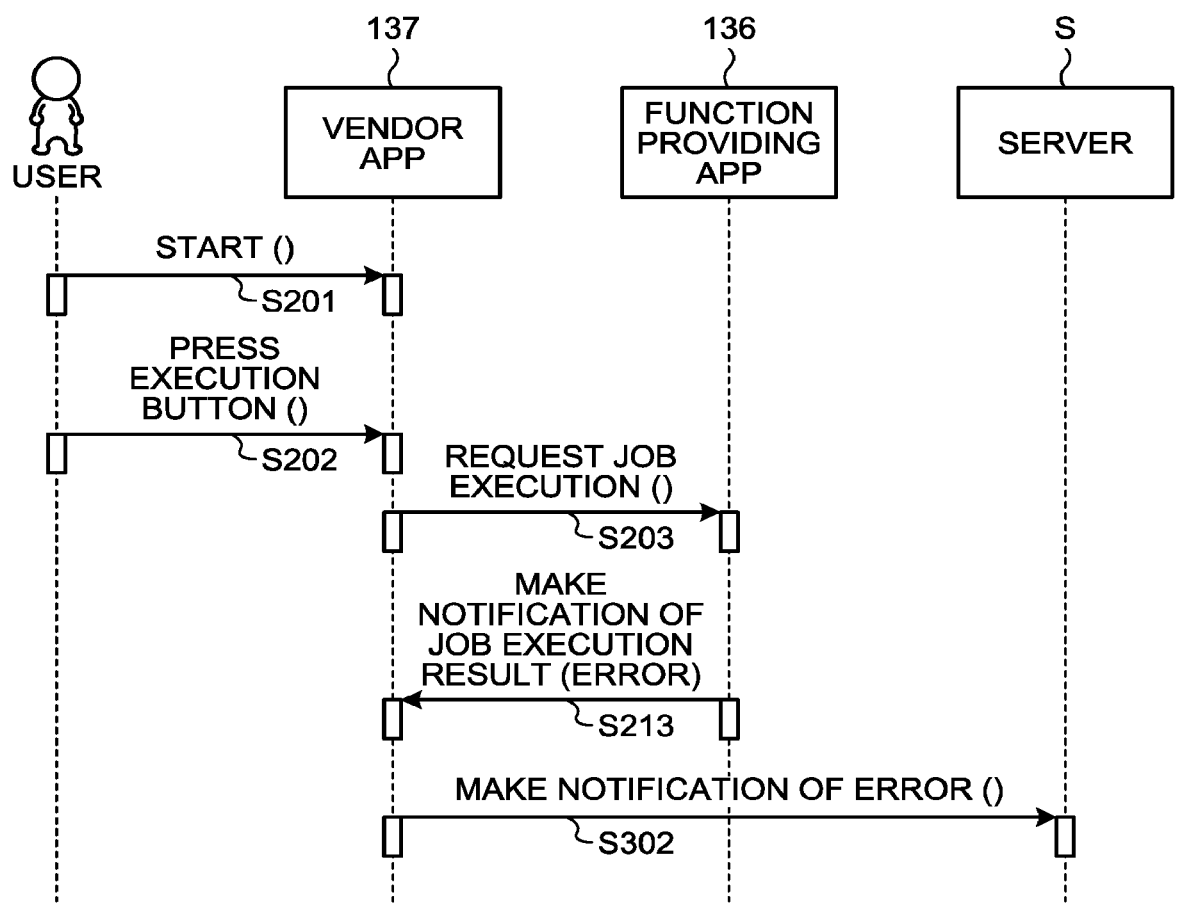
FIG. 25 is a sequence diagram showing an example of an action of the vendor app when notified of an unrecoverable error.

Moreover, FIG. 25 is a sequence diagram showing an example of an action of the vendor app 137 when notified of an unrecoverable error.

As shown in FIG. 25, when a error, notification of which is received, is an unrecoverable critical error, the vendor app 137 notifies a server S that an error has occurred because it is helpless even if the vendor app 137 calls the function providing app 136 again (step S302).

As described, according to the present embodiment, an error dialog is displayed according to an error type of an error that has occurred in a job executed by the function providing app 136, and changes timing when the function providing app 136 notifies the vendor app 137 of a call source, of a result according to an error type. Therefore, when an error occurs in a job executed by calling the function providing app 136, it is possible to notify the user of the error properly.

Sixth Embodiment

Next, a sixth embodiment is described.

The sixth embodiment differs from the third embodiment to the fifth embodiment in a point that the need for the vendor app 137 to determine whether the vendor app 137 itself is currently sending a request to the function providing app 136 is eliminated. Hereinafter, in the description of the sixth embodiment, description about a point same as the third embodiment to the fifth embodiment is omitted, and a point different from the third embodiment to the fifth embodiment is described.

Figure 26:
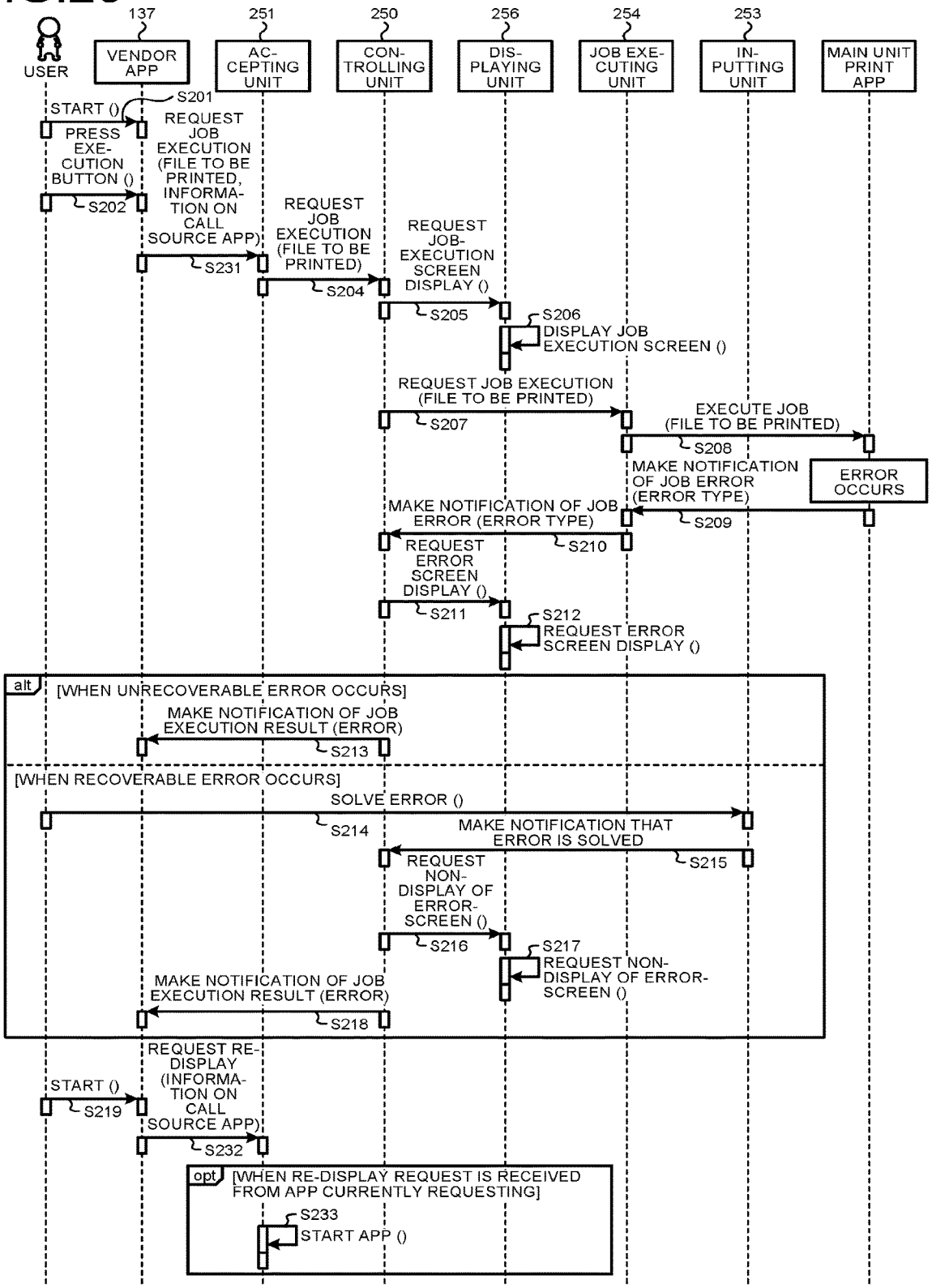
FIG. 26 is a sequence diagram showing a flow of a screen display action of a function providing app according to a sixth embodiment.

An action of the function providing app 136 according to the sixth embodiment is described herein. FIG. 26 is a sequence diagram showing a flow of a screen display action of the function providing app 136 when a job is executed with the vendor app 137 according to a sixth embodiment.

As shown in FIG. 26, when the vendor app 137 is started by a user through the home screen A (step S201) and the execution button B2 is operated (step S202), the vendor app 137 issues a job execution request with respect to the function providing app 136 (step S231). The vendor app 137 adds app information on the vendor app 137 to parameters at this time.

Since steps S204 to S218 shown in FIG. 26 include nothing different from steps S204 to S218 shown in FIG. 21, the description thereof is omitted.

When the vendor app 137 is started through the home screen A by the user (step S219), the vendor app 137 issues a re-display request with respect to the accepting unit 251 (step S232). At this time, the vendor app 137 adds app information on the vendor app 137 of a call source to parameters.

The accepting unit 251 determines whether it is a re-display request from an app currently requesting, and starts the app when the app currently requesting and the app that has sent the re-display request are the same (step S233).

As described, according to the present embodiment, the need for the vendor app 137 to determine whether the vendor app 137 itself is sending a request to the function providing app 136 is eliminated, and implementation of the vendor app 137 becomes simple.

In the above embodiments, an example in which the image processing apparatus (electronic device) of the present invention is applied to an MFP having at least two functions out of the copier function, the printer function, the scanner function, and the facsimile function is described, but it is applicable to any image processing apparatus that has at least a scanner or a printer and that performs image processing, such as an MFP, a printer, a scanner device, and a facsimile device.

The electronic device is not limited to the MFP 1 as long as it is a device having a communication function. The electronic device may be, for example, a projector (PJ), an interactive white board (IWB: interactive whiteboard having an electronic blackboard function), an output device such as a digital signage, a head up display (HUD) device, industrial equipment, a manufacturing device, an imaging device, a sound collecting device, a medical equipment, a network home appliance, a laptop personal computer (PC), a mobile phone, a smartphone, a tablet terminal, a game machine, a personal digital assistant (PDA), a digital camera, a wearable PC, or a desktop PC.

The respective functions described in the above embodiments can be implemented by one or more processing circuits. Note that "processing circuit" in the present specification includes a processor that is programmed to perform respective functions by software as a processor implemented by an electronic circuit, and a device such as an application specific integrated circuit (ASIC), a digital signal processor (DSP), a field programmable gate array (FPGA), and a conventional circuit module designed to perform the respective functions described above.

The sequence, control, and operation of the embodiments described above can be performed and processed by the electronic device or the image processing apparatus, flexibly combined, or in parallel at the same time. Thus, an effect of reducing a sense of incongruity given to a user due to difference in display contents, and an effect of reflecting settings by passing respective parameters and setting information in a simple manner in a relation between a vendor app and a function providing app, or in a relation among multiple vendor apps are produced.

The "vendor app" described above can also be designated as

"request application" that requests processing to the function providing application;

"additional application" that is additionally installed on an operation unit of a device that is developed by a third vendor or a user;

"use application" that uses systems (UI, API, and the like) provided by the function providing application in the operation unit; and the like as other expressions. Moreover, the "function providing application" can also be designated as "API application" or "operation-unit API application" that provides API to other applications running under an OS installed on the operation unit of the electronic device and the image processing apparatus by a CPU and running in the operation unit.

According to an embodiment, display appearances among apps, such as a UI of a function providing app and a UI of a call source app that calls functions of the function providing app, are unified, to produce an effect of preventing a sense of incongruity given to users.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An electronic device comprising:
   processing circuitry configured to implement
      at least one application; and
      a function providing application comprising:
         a first accepting unit configured to accept a display request of a screen from the at least one application, the display request including a parameter relating to a display appearance of the screen; and
         a first displaying unit configured to display the screen, a display appearance of which is changed based on the parameter in accordance with the display request accepted by the first accepting unit,
   wherein the electronic device is an image processing apparatus including at least any one of a scanner and a printer, and configured to perform image processing,
   the function providing application is configured to display a selecting screen and a setting input screen in a display appearance including at least one of a background color and a background image in common with the at least one application based on the parameter, the selecting screen being displayed in response to a request from the at least one application including the parameter, and being to select between a setting input for image processing and execution instruction for image processing, the setting input screen for image processing being displayed when the setting input is selected.

2. The electronic device according to claim 1, the processing circuitry being further configured to implement a first storing unit configured to store a combination of the parameter accepted by the first accepting unit and user information to identify a user in a memory, wherein
   the first displaying unit is configured to acquire the combination of the user information and the parameter from the memory, and change the display appearance of the screen based on the acquired parameter.

3. The electronic device according to claim 1, further comprising a control application configured to perform and control a function of the electronic device, wherein
   the function providing application further includes a first controlling unit configured to request the control application to perform the function based on setting information accepted from a user through the screen that is displayed by the first displaying unit, and the display appearance of which is changed based on the parameter.

4. The electronic device according to claim 3 wherein
   the function providing application includes:
      a second accepting unit configured to accept a request for the control application to perform the function of the electronic device, and a parameter relating to an identifier added to the request, from an application of the at least one application;
      a second storing unit configured to store the request and the parameter accepted by the second accepting unit in the memory;
      a setting unit configured to adjust setting information according to the request; and
      a second controlling unit configured to request the control application to perform the function of the electronic device in accordance with the request accepted by the second accepting unit, and
   the second controlling unit is configured to extract the setting information regarding current requesting, from the setting unit, and provides the setting information when the second accepting unit accepts a request to which a parameter of another identifier is added, from another application different from the application, and
   the application is configured to add the provided setting information, the identifier, and the setting information to a parameter when issuing the request to the second accepting unit again.

5. The electronic device according to claim 4, wherein
   the second controlling unit informs the application of necessity for retry along with the setting information, when providing the setting information.

6. The electronic device according to claim 4, wherein
   the second controlling unit is configured to store current setting information in the second storing unit in addition to the identifier.

7. The electronic device according to claim 4,
   the processing circuitry being further configured to implement
      a second displaying unit configured to display a screen; and
      a job executing unit configured to receive a job error to which an error type is added from the control application, and to notify the second controlling unit of the job error, wherein
   the second controlling unit is configured to, when receiving notification of the job error, issue an error-screen display request according to the error type with respect to the second displaying unit, and make job-execution result notification to the application when the error type is of an unrecoverable error, and issue an error-screen non-display request to the second displaying unit, triggered by notification that the error is solved when the error type is of a recoverable error.

8. The electronic device according to claim 3 wherein the control application is configured to perform the image processing based on the setting input for image processing thus input.

9. The electronic device according to claim 8, wherein the image processing apparatus includes:
- a main device including a first central processing unit (CPU) and configured to perform image processing, the first CPU being configured to execute the control application; and
- an operation device including a second CPU, as the processing circuitry, and configured to accept an operation of execution instruction for image processing from a user, the second CPU being configured to execute the at least one application and the function providing application, and
- the second CPU is configured to, when accepting a setting input for image processing and an input to instruct execution of image processing from the user on a display screen of the function providing application, send a request to the main device from the operation device according to the input, and the first CPU is configured to use the control application to perform image processing based on the setting input.

10. A screen display method that is performed by an electronic device, the method comprising:
- accepting a display request of a screen from at least one application, the display request including a parameter relating to a display appearance of the screen; and
- displaying the screen, a display appearance of which is changed based on the parameter in accordance with the display request accepted at the accepting,
- wherein the electronic device is an image processing apparatus including at least any one of a scanner and a printer, and configured to perform image processing,
- the method further including displaying a selecting screen and a setting input screen in a display appearance including at least one of a background color and a background image in common with the at least one application based on the parameter, the selecting screen being displayed in response to a request from the at least one application including the parameter, and being to select between a setting input for image processing and execution instruction for image processing, the setting input screen for image processing being displayed when the setting input is selected.

11. A computer program product comprising a non-transitory computer-readable medium including programmed instructions that cause a computer configured to control an electronic device to execute:
- accepting a display request of a screen from at least one application, the display request including a parameter relating to a display appearance of the screen; and
- displaying the screen, a display appearance of which is changed based on the parameter in accordance with the display request accepted at the accepting,
- wherein the electronic device is an image processing apparatus including at least any one of a scanner and a printer, and configured to perform image processing,
- the method further including displaying a selecting screen and a setting input screen in a display appearance including at least one of a background color and a background image in common with the at least one application based on the parameter, the selecting screen being displayed in response to a request from the at least one application including the parameter, and being to select between a setting input for image processing and execution instruction for image processing, the setting input screen for image processing being displayed when the setting input is selected.

\* \* \* \* \*